(12) United States Patent
Otsubo et al.

(10) Patent No.: US 8,951,163 B2
(45) Date of Patent: Feb. 10, 2015

(54) CONTROL DEVICE FOR VEHICLE

(75) Inventors: Hideaki Otsubo, Miyoshi (JP);
Masayuki Baba, Toyota (JP); Takaaki Tokura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 171 days.

(21) Appl. No.: 13/634,850

(22) PCT Filed: Mar. 15, 2010

(86) PCT No.: PCT/JP2010/054346
§ 371 (c)(1),
(2), (4) Date: Sep. 13, 2012

(87) PCT Pub. No.: WO2011/114425
PCT Pub. Date: Sep. 22, 2011

(65) Prior Publication Data
US 2013/0013161 A1    Jan. 10, 2013

(51) Int. Cl.
*B60W 10/04* (2006.01)
*B60W 10/10* (2012.01)
*F16H 61/02* (2006.01)
*B60W 10/06* (2006.01)
*B60W 10/115* (2012.01)
*B60W 30/182* (2012.01)
*B60W 30/188* (2012.01)
*B60W 50/06* (2006.01)
*B60W 50/00* (2006.01)

(52) U.S. Cl.
CPC ........... *F16H 61/0213* (2013.01); *B60W 10/06* (2013.01); *B60W 10/115* (2013.01); *B60W 30/182* (2013.01); *B60W 30/1882* (2013.01); *B60W 50/06* (2013.01); *B60W 2050/0096* (2013.01)

USPC .............................. 477/115; 477/120; 701/52

(58) Field of Classification Search
USPC ........ 477/107, 115, 111, 120; 701/51, 52, 54, 701/55
See application file for complete search history.

(56) References Cited

U.S. PATENT DOCUMENTS 7,001,307 B2 * 2/2006 Matsunaga et al. ............ 477/118
7,258,649 B2 * 8/2007 Matsunaga et al. ............ 477/120

(Continued)

FOREIGN PATENT DOCUMENTS

JP      10-103492 A     4/1998
JP      2000-074197 A   3/2000

(Continued)

*Primary Examiner* — Justin Holmes
(74) *Attorney, Agent, or Firm* — Gifford, Krass, Sprinkle, Anderson & Citkowski, P.C.

(57) ABSTRACT

Provided is a control device for a vehicle that can switch between an automatic gear shift mode in which gear shifting of the automatic transmission is performed according to a vehicle traveling condition, and a manual gear shift mode in which gear shifting of the automatic transmission is performed according to a driver operation, and that changes drive force characteristics by controlling output torque of the drive source at the time of a gear shift mode switch. When the gear shift mode is switched between automatic and manual the control device selects an initial gear stage or an initial gear ratio for the gear shift mode switch such that the amount of change in drive force that accompanies the gear shift mode switch decreases, or such that the direction of change in drive force that accompanies the gear shift mode switch conforms to the driver's intention or expected sensation.

20 Claims, 17 Drawing Sheets

(56) References Cited

U.S. PATENT DOCUMENTS

| | | | |
|---|---|---|---|
| 7,337,051 B2 * | 2/2008 | Ota et al. | 701/51 |
| 7,367,922 B2 * | 5/2008 | Gueter | 477/115 |
| 8,135,521 B2 * | 3/2012 | Sugiura et al. | 701/52 |
| 8,175,778 B2 * | 5/2012 | Kitaori | 701/52 |
| 2003/0232680 A1 | 12/2003 | Matsunaga et al. | |
| 2009/0024292 A1 * | 1/2009 | Kuwahara et al. | 701/70 |
| 2009/0088935 A1 * | 4/2009 | Kitaori | 701/52 |
| 2010/0010716 A1 * | 1/2010 | Sawada et al. | 701/52 |
| 2010/0100289 A1 * | 4/2010 | Tawara et al. | 701/52 |
| 2010/0197457 A1 | 8/2010 | Kuwahara et al. | |

FOREIGN PATENT DOCUMENTS

| | | |
|---|---|---|
| JP | 2004-068957 A | 3/2004 |
| JP | 2007-139059 A | 6/2007 |
| JP | 2008-261440 A | 10/2008 |
| JP | 2009-121238 A | 6/2009 |
| JP | 2009-121655 A | 6/2009 |
| WO | 2009-060293 A2 | 5/2009 |

* cited by examiner

FIG.4
|     | C1 | C2 | C3 | C4 | B1 | B2 | B3 | B4 | F0 | F1 | F2 | F3 |
|-----|----|----|----|----|----|----|----|----|----|----|----|----|
| P   |    |    |    |    |    |    |    |    |    |    |    |    |
| R   |    |    | ○  |    | ◎  |    |    | ○  |    | ○  |    |    |
| N   |    |    |    |    |    |    |    |    |    |    |    |    |
| 1st | ○  |    |    | ◎  |    |    |    | ◎  | ○  |    |    | ○  |
| 2nd | ○  |    |    | ◎  |    | ◎  | ○  |    | ○  | ○  | ○  |    |
| 3rd | ○  |    | ○  | ◎  | ◎  |    | △  |    | ○  | ○  |    |    |
| 4th | ○  | ○  | △  | ◎  |    |    | △  |    | ○  |    |    |    |
| 5th | △  | ○  | ○  |    | ○  |    | △  |    |    |    |    |    |
| 6th | △  | ○  |    |    | △  | ○  | △  |    |    |    |    |    |
○ Engaged
◎ Engaged during engine braking
△ Engaged unrelated to power transmission
FIG.5
(a)
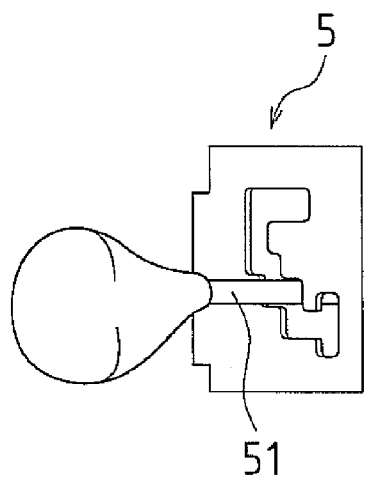
(b)
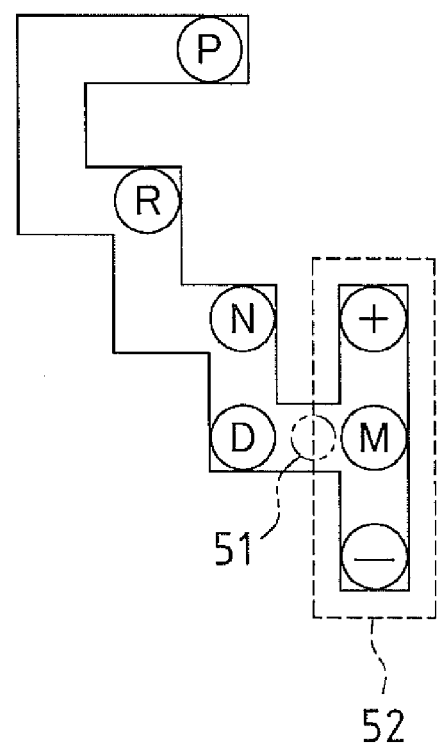

CONTROL DEVICE FOR VEHICLE

TECHNICAL FIELD

The present invention relates to a control device for a vehicle that is equipped with a drive source for traveling such as an internal combustion engine (hereinafter, also referred to as an engine), and an automatic transmission provided in a drive force transmission route between the drive source and a drive wheel. More specifically, the present invention relates to a control device for a vehicle that can switch between an automatic gear shift mode in which gear shifting of an automatic transmission is performed according to a vehicle traveling condition, and a manual gear shift mode in which gear shifting of the automatic transmission is performed according to a driver operation.

BACKGROUND ART

In a vehicle equipped with an engine, as a transmission by which torque and rotational speed generated by the engine are appropriately transmitted to drive wheels according to the traveling condition of the vehicle, there is known to be an automatic transmission in which the gear ratio between the engine and the drive wheels is automatically set optimally.

Examples of automatic transmissions mounted in vehicles include a stepped automatic transmission in which multiple gear stages having different gear ratios are set using a planetary gear device and frictional engaging elements such as clutches and brakes, and a belt-type stepless transmission (continuously variable transmission (CVT)) in which the gear ratio is adjusted in a stepless manner.

In a vehicle equipped with a stepped automatic transmission, an electronic control unit (ECU) or the like stores a gear shift map that has gear shift lines (up-shift lines and down-shift lines) for obtaining an optimum gear stage according to the vehicle speed and accelerator opening degree (or throttle opening degree), and a gear stage is automatically set by calculating a target gear stage with reference to the gear shift map based on the vehicle speed and the accelerator opening degree, and engaging in a predetermined state or releasing clutches, brakes, a one-way clutch, or the like, which are frictional engaging elements, based on the target gear stage.

In a vehicle equipped with a stepped automatic transmission, a shift lever that is operated by a driver (user) is provided, and the shift position of the automatic transmission can be switched to a P position (parking range), an R position (reverse range), an N position (neutral range), a D position (drive range), and the like by operating the shift lever. Also, recent years have seen the practical use of automatic transmissions in which a manual gear shift mode (sequential mode) can be selected as well, and the gear stage (gear range) of the automatic transmission can be arbitrarily switched by a driver operation performed on the shift lever, a manual operation switch (e.g., a paddle switch), or the like (e.g., see PTL 1 and PTL 2).

Among vehicles equipped with a stepless transmission as well, there are vehicles in which in addition to an automatic gear shift mode in which the gear ratio of a stepless transmission is automatically switched according to the traveling condition of the vehicle, it is possible to select a manual gear shift mode in which the gear ratio of the stepless transmission is switched according to a driver operation performed on a shift lever, a manual operation switch, or the like.

With such a vehicle that can be switched between an automatic gear shift mode and a manual gear shift mode, sporty traveling with a sense of directness is possible in the manual gear shift mode, for example, by switching the chive force characteristics under the same conditions (same vehicle speed and same accelerator opening degree) in the automatic gear shift mode and the manual gear shift mode, for example.

Also, with a vehicle that can be switched between gear shift modes, when there is a switch from the automatic gear shift mode to the manual gear shift mode, the gear stage (gear ratio) that was selected in the automatic gear shift mode (D range) immediately previously to the operation for switching the gear shift mode is set as the initial gear stage (initial gear ratio) in the manual gear shift mode (M range) to which the gear shift mode is switched (conventional control). Also, when there is a switch from the manual gear shift mode (M range) to the automatic gear shift mode (D range), the initial gear stage (initial gear ratio) in the automatic gear shift mode (D range) to which the gear shift mode is switched is determined based on the gear shift lines of the aforementioned gear shift map (e.g., see FIG. 8).

CITATION LIST

Patent Literature

[PTL 1] JP 2008-261440A
[PTL 2] JP 2007-139059A
[PTL 3] JP 3436017
[PTL 4] JP 2009-121238A

DISCLOSURE OF INVENTION

Technical Problems

Incidentally, with vehicles that can be switched between gear shift modes, when control for switching the drive force characteristics between the automatic gear shift mode and the manual gear shift mode is performed as described above, there are cases where the drive force changes suddenly when the gear shift mode is switched. This will be described below.

In a vehicle equipped with a stepped automatic transmission, in the case where the drive force characteristics of the automatic gear shift mode and the manual gear shift mode are as shown in FIG. 18, if the third speed is selected in the automatic gear shift mode (D range) while traveling with a vehicle speed of 40 [km/h] and an accelerator opening degree of 40[%] for example, and then a switch from the automatic gear shift mode to the manual gear shift mode (M range) is carried out, according to conventional control, the gear stage that was selected in the automatic transmission mode is set as the initial gear stage in the manual gear shift mode, and therefore the third speed (M-3rd) is selected as the initial gear stage in the manual gear shift mode to which the gear shift mode is switched. However, when this initial gear stage is selected, the drive force of the vehicle increases when the gear shift mode is switched from automatic to manual, and there is a sudden change in the drive force as is clear from FIG. 18, and thus there are cases where the driver feels a sense of unpleasantness.

Also, when there is a switch from the manual gear shift mode to the automatic gear shift mode, the initial gear stage of the automatic gear shift mode to which the gear shift mode is switch is determined based on the gear shift lines of the aforementioned gear shift map, and therefore depending on conditions regarding the vehicle speed and the accelerator opening degree, there are cases where the initial gear stage in the automatic gear shift mode at the time of the gear shift mode switch is the same as the gear stage that was selected in the manual gear shift mode before the switch, and sometimes only the drive force of the vehicle increases in those cases. For example, according to the gear shift map shown in FIG. 8, in the case where the fifth speed is selected in the manual gear shift mode while traveling with a vehicle speed of 40 [km/h] and an accelerator opening degree of 40[%], and then there is a switch from the manual gear shift mode to the automatic gear shift mode, the fifth speed is maintained since the accelerator opening degree for the [5→4] down-shift line at the vehicle speed of 40 [km/h] is set to au accelerator opening degree that is higher than 40[%]. When such a gear shift mode switch is performed, if the gear shift mode switch is accompanied by an increase in the drive force, the drive force alone rises while the gear stage remains at the fifth speed, and therefore there are cases where the driver feels a sense of unpleasantness.

Furthermore, with conventional control, there are cases where the direction of change in the drive force (increase or decrease) that accompanies a switch in the gear shift mode from automatic to manual, or from manual to automatic, does not conform to the driver's intention or expected sensation.

For example, in the case where the driver intends for acceleration when switching from the automatic gear shift mode to the manual gear shift mode, sometimes the initial gear stage (initial gear stage in the M range) that is selected is a gear stage according to which the change in the drive force that accompanies the gear shift mode switch is not change in the increasing direction. There are cases where the driver feels a sense of unpleasantness when such a situation occurs. Also, even in the case where there is a switch from the manual gear shift mode to the automatic gear shift mode, sometimes a situation occurs in which the direction of change in the drive force (increasing or decreasing) that accompanies the gear shift mode switch does not conform to the driver's expected sensation.

The above-described problems can be said to similarly occur in a vehicle that is equipped with a stepless transmission, in which the gear ratio is adjusted steplessly, as the automatic transmission, and that can be switched between the automatic gear shift mode and the manual gear shift mode.

The present invention has been achieved in consideration of the above circumstances, and an object thereof is to, in a control device for a vehicle in which an automatic gear shift mode and a manual gear shift mode can be selected, realize control that does not give the driver a sense of unpleasantness when there is a switch in the gear shift mode from automatic to manual, or a switch in the gear shift mode from manual to automatic.

Means for Solving the Problems

—Principle of Solution to the Problems—

A principle of a solution of the present invention devised in order to achieve the aforementioned object is that in a control device for a vehicle in which an automatic gear shift mode and a manual gear shift mode can be selected, when there is a switch in the gear shift mode from automatic to manual or a switch in the gear shift mode from manual to automatic, the initial gear stage or initial gear ratio at the time of the gear shift mode switch is selected such that the amount of change in the drive force that accompanies the gear shift mode switch decreases, or such that the direction of change in the drive force that accompanies the gear shift mode switch conforms to the driver's intention or expected sensation, so as to suppress a situation in which the driver feels a sense of unpleasantness when the gear shift mode is switched.

—Solution Means—

Specifically, the present invention is premised on a control device for a vehicle for application to a vehicle that is equipped with a drive source for traveling (e.g., an engine) and an automatic transmission, the control device being capable of switching between an automatic gear shift mode in which gear shifting of the automatic transmission is performed according to a vehicle traveling condition, and a manual gear shift mode in which gear shifting of the automatic transmission is performed according to a driver operation, and the control device changing a drive force characteristic by controlling output torque of the drive source at the time of a gear shift mode switch. A technical feature of the control device for a vehicle is that the control device selects, as an initial gear stage or an initial gear ratio for when a switch from the automatic gear shift mode to the manual gear shift mode occurs or as an initial gear stage or an initial gear ratio for when a switch from the manual gear shift mode to the automatic gear shift mode occurs, a gear stage or a gear ratio according to which an amount of change in drive force of the vehicle that accompanies the gear shift mode switch is low.

According to this aspect of the invention, when a switch from the automatic gear shift mode to the manual gear shift mode occurs, or when a switch from the manual gear shift mode to the automatic gear shift mode occurs, a sudden change in drive force that accompanies the gear shift mode switch is diminished, thus making it possible to prevent giving the driver a sense of unpleasantness.

Another solution means according to the present invention is a control device for application to a vehicle that is equipped with a drive source for traveling (e.g., an engine) and an automatic transmission, the control device being capable of switching between an automatic gear shift mode in which gear shifting of the automatic transmission is performed according to a vehicle traveling condition, and a manual gear shift mode in which gear shifting of the automatic transmission is performed according to a driver operation, and the control device changing a drive force characteristic by controlling output torque of the drive source at the time of a gear shift mode switch, wherein the control device is configured so as to select, as an initial gear stage or an initial gear ratio for when a switch from the automatic gear shift mode to the manual gear shift mode occurs or as an initial gear stage or an initial gear ratio for when a switch from the manual gear shift mode to the automatic gear shift mode occurs, a gear stage or a gear ratio according to which a direction of change in drive force of the vehicle that accompanies the gear shift mode switch is taken into consideration.

According to this aspect of the invention, when a switch from the automatic gear shift mode to the manual gear shift mode occurs, or when a switch from the manual gear shift mode to the automatic gear shift mode occurs, the initial gear stage or the initial gear ratio at the time of the gear shift mode switch can be selected so as to reflect the driver's intention or expected sensation. The following describes a specific example of this.

First, a configuration for determining whether a driver has an intention to accelerate is provided, wherein when a switch from the automatic gear shift mode to the manual gear shift mode occurs, if the driver's intention is an intention to accelerate, the control device selects, as an initial gear stage or an initial gear ratio for the manual gear shift mode, a gear stage or a gear ratio according to which the drive force of the vehicle changes in an increasing direction when the gear shift mode occurs, from among selection candidate gear stages or selection candidate gear ratios that can be selected at the time of the switch to the manual gear shift mode. More specifically, the control device selects, as the initial gear stage or the initial gear ratio, a gear stage or a gear ratio according to which an amount of increase in the drive force of the vehicle is lowest, from among the selection candidate gear stages or the selection candidate gear ratios.

Due to selecting the initial gear stage or the initial gear ratio for the switch to the manual gear shift mode in this way, the drive force is higher than when in the automatic gear shift mode, but since the driver's intention is an intention to accelerate when the gear shift mode is switched, the increase in drive force reflects the driver's intention, thus enabling suppressing a situation in which the driver feels a sense of unpleasantness.

Also, a configuration for determining whether a driver has an intention to decelerate is provided, wherein when a switch from the automatic gear shift mode to the manual gear shift mode occurs, if the driver's intention is an intention to decelerate, the control device selects, as an initial gear stage or an initial gear ratio for the manual gear shift mode, a gear stage or a gear ratio according to which the drive force of the vehicle changes in a decreasing direction when the gear shift mode occurs, from among selection candidate gear stages or selection candidate gear ratios that can be selected at the time of the switch to the manual gear shift mode. More specifically, the control device selects, as the initial gear stage or the initial gear ratio, a gear stage or a gear ratio according to which an amount of decrease in the drive force of the vehicle is lowest, from among the selection candidate gear stages or the selection candidate gear ratios.

Due to selecting the initial gear stage or the initial gear ratio for the switch to the manual gear shift mode in this way, the drive force is lower than when in the automatic gear shift mode, but since the driver's intention is an intention to decelerate when the gear shift mode is switched, the decrease in drive force reflects the driver's intention, thus enabling suppressing a situation in which the driver feels a sense of unpleasantness.

Here, as a specific configuration of the means for determining the driver's intention, it is determined whether the driver has an intention to accelerate or an intention to decelerate based on an accelerator opening degree recognized by an accelerator opening degree recognition means for recognizing an accelerator pedal opening degree (e.g., an accelerator opening degree sensor). Also, a configuration is possible in which it is determined whether the driver has an intention to accelerate or an intention to decelerate based on an accelerator opening degree based on an amount of change in the accelerator opening degree, and a configuration is possible in which it is determined whether the driver has an intention to accelerate or an intention to decelerate based on an accelerator opening degree based on the accelerator opening degree and the amount of change in the accelerator opening degree.

As another specific configuration of the present invention, when a switch from the manual gear shift mode to the automatic gear shift mode occurs, if the drive force of the vehicle changes in an increasing direction, the control device selects, as the initial gear stage or the initial gear ratio, a gear stage or a gear ratio according to which an output rotational speed of the drive source (e.g., engine speed) changes in an increasing direction, from among selection candidate gear stages or selection candidate gear ratios that can be selected at the time of the switch to the automatic gear shift mode. In this case, the control device selects, as the initial gear stage or the initial gear ratio, a gear stage or a gear ratio according to which an amount of increase in the output rotational speed of the drive source is lowest, from among the selection candidate gear stages or the selection candidate gear ratios.

Due to selecting the initial gear stage or the initial gear ratio for the switch to the automatic gear shift mode in this way, the drive force is higher than when in the manual gear shift mode, but since an increase in the output rotational speed of the drive source (engine speed) occurs along with the rise in drive force, the gear shift mode switching processing can conform to the driver's expected sensation (increase in engine speed and increase in drive force). This enables suppressing a situation in which the driver feels a sense of unpleasantness.

Also, as another specific configuration, when a switch from the manual gear shift mode to the automatic gear shift mode occurs, if the drive force of the vehicle changes in a decreasing direction, the control device selects, as the initial gear stage or the initial gear ratio, a gear stage or a gear ratio according to which an output rotational speed of the drive source (e.g., engine speed) changes in a decreasing direction, from among selection candidate gear stages or selection candidate gear ratios that can be selected at the time of the switch to the automatic gear shift mode. In this case, the control device selects, as the initial gear stage or the initial gear ratio, a gear stage or a gear ratio according to which an amount of decrease in the output rotational speed of the drive source is lowest, from among the selection candidate gear stages or the selection candidate gear ratios.

Due to selecting the initial gear stage or the initial gear ratio for the switch to the automatic gear shift mode in this way, the drive force is lower than when in the manual gear shift mode, but since a decrease in the output rotational speed of the drive source (engine speed) occurs along with the decrease in drive force, the gear shift mode switching processing can conform to the driver's expected sensation (decrease in engine speed and decrease in drive force). This enables suppressing a situation in which the driver feels a sense of unpleasantness.

Here, when a switch from the manual gear shift mode to the automatic gear shift mode occurs, if a selection candidate gear stage or a selection candidate gear ratio according to which a direction of change in the drive force of the vehicle is the same as a direction of change in an output rotational speed of the drive source (e.g., engine speed) does not exist, the control device selects, as the initial gear stage or the initial gear ratio, a gear stage or a gear ratio according to which an amount of change in the output rotational speed of the drive source is lowest, from among the selection candidate gear stages or the selection candidate gear ratios, thus suppressing a situation in which the driver feels a sense of unpleasantness.

Also, when a switch from the manual gear shift mode to the automatic gear shift mode occurs, if selection candidate gear ratios according to which the drive force of the vehicle changes in an increasing direction and a decreasing direction exist, the control device selects, as the initial gear stage or the initial gear ratio for the automatic gear shift mode, a gear stage or a gear ratio according to which an amount of change in the drive force of the vehicle is lowest, from among selection candidate gear stages or selection candidate gear ratios that can be selected at the time of the switch to the automatic gear shift mode. Applying this selection processing enables suppressing a sudden change in drive force that accompanies a switch from the automatic gear shift mode to the manual gear shift mode, thus making it possible to prevent giving the driver a sense of unpleasantness.

In the control device for a vehicle according to the present invention, the automatic transmission provided in the automatic transmission may be a stepped transmission in which a plurality of gear stages having different gear ratios are established by selectively engaging a plurality of frictional engaging elements, or may be a stepless transmission in which the gear ratio is changed in a stepless manner.

Effects of the Invention

According to the present invention, when there is a switch from an automatic gear shift mode to a manual gear shift mode, or when there is a switch from the manual gear shift mode to the automatic gear shift mode, an initial gear stage or an initial gear ratio at the time of the gear shift mode switch is selected such that an amount of change in the drive force that accompanies the gear shift mode switch decreases, or such that the direction of change in the drive force that accompanies the gear shift mode switch conforms to the driver's intention or expected sensation, so as to suppress a situation in which the driver feels a sense of unpleasantness when the gear shift mode is switched.

BRIEF DESCRIPTION OF DRAWINGS

FIG. 4 is a table of operations of the automatic transmission shown in FIG. 3.

FIG. 5($a$) is a perspective view of a relevant portion of a shift operation device, and FIG. 5($b$) shows a shift gate of the shift operation device.

MODE FOR CARRYING OUT THE INVENTION

The following describes embodiments of the present invention with reference to the drawings.

Embodiment 1

Figure 1:
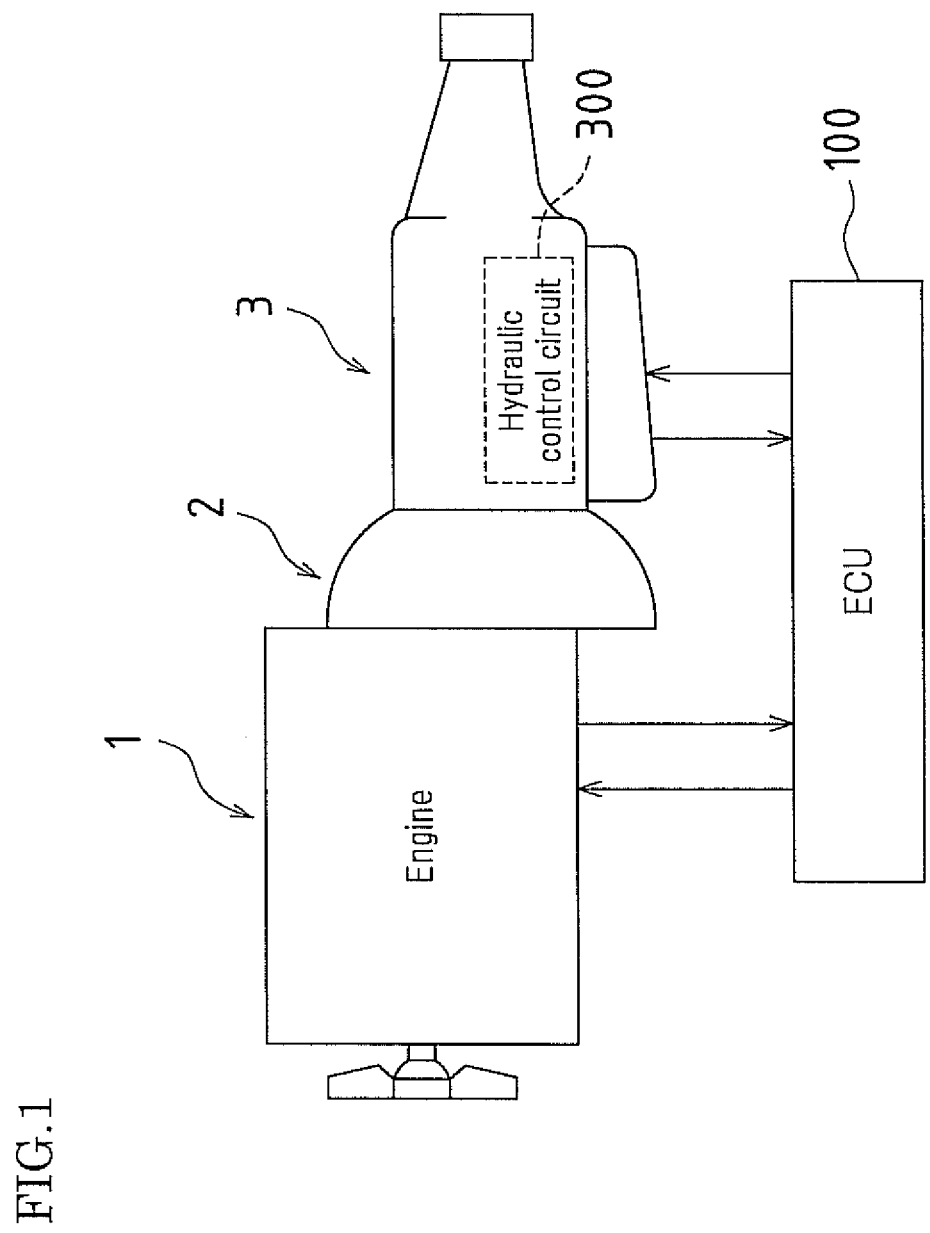
FIG. 1 is a schematic configuration diagram showing part of a vehicle to which the present invention is applied.

FIG. 1 is a schematic configuration diagram showing an example of a vehicle to which the present invention is applied.

In this example, the vehicle is a front-engine, rear-wheel drive (FR) vehicle that includes an engine 1, an automatic transmission 3 in which a torque converter 2 is provided, an ECU 100, and the like, and a control device for a vehicle according to the present invention is realized by a program that is executed by the ECU 100. The following describes parts of the engine 1, the torque converter 2, the automatic transmission 3, the ECU 100, and the like.

—Engine—

Figure 2:
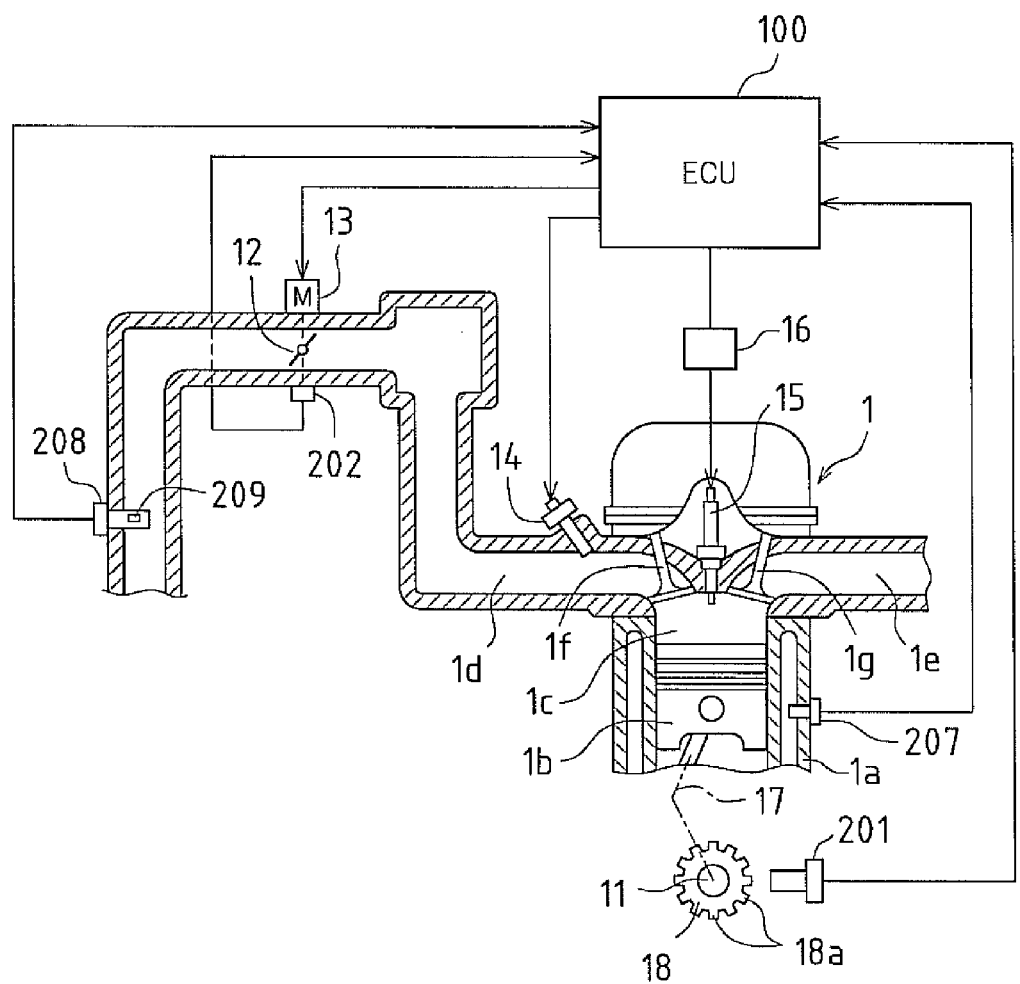
FIG. 2 is a schematic configuration diagram of an engine applied to the vehicle in FIG. 1.

The engine 1 is a four-cylinder gasoline engine for example, and as shown in FIG. 2, pistons 1$b$ that move back and forth in the vertical direction are provided in cylinder blocks 1$a$ that constitute the cylinders. Each piston 1$b$ is coupled to a crankshaft 11 via a connecting rod 17, and the back-and-forth movement of the piston 1$b$ is converted into rotation of the crankshaft 11 by the connecting rod 17. The crankshaft 11 is connected to the input shaft of the torque converter 2.

The rotational speed of the crankshaft 11 (engine speed) is detected by an engine speed sensor 201. The engine speed sensor 201 is, for example, an electromagnetic pickup, and generates a pulsed signal (output pulses) corresponding to protrusions 18$a$ of a signal rotor 18 when the crankshaft 11 rotates.

A water temperature sensor 207 that detects the engine water temperature (coolant temperature) is disposed in a cylinder block 1$a$ of the engine 1. A spark plug 15 is disposed in a combustion chamber 1$c$ of the engine 1. The ignition timing of the spark plug 15 is adjusted by an igniter 16. The igniter 16 is controlled by the ECU 100.

An intake path id and an exhaust path 1$e$ are connected to the combustion chamber 1$c$ of the engine 1. An intake valve if is provided between the intake path 1$d$ and the combustion chamber 1$c$, and the intake path 1$d$ and the combustion chamber 1$c$ are put into communication or cut off by driving the intake valve if so as to open/close. Also, an exhaust valve 1$g$ is provided between the combustion chamber 1$c$ and the exhaust path 1$e$, and the combustion chamber 1$c$ and the exhaust path 1$e$ are put into communication or cut off by driving the exhaust valve 1$g$ so as to open/close. The open/close driving of the intake valve if and the exhaust valve 1$g$ is performed by rotation of an intake camshaft and an exhaust camshaft respectively, to which rotation of the crankshaft 11 is transmitted.

Disposed in the intake path 1$d$ are a hot-wire air flow meter (intake air amount sensor) 208, an intake temperature sensor 209 (built into the air flow meter 208), an electronically-controlled throttle valve 12 for adjusting the intake air amount of the engine 1, and the like. The throttle valve 12 is driven by a throttle motor 13. The throttle opening degree of the throttle valve 12 can be electronically controlled independently of an accelerator pedal operation performed by a driver, and the opening degree (throttle opening degree) is detected by a throttle opening degree sensor 202. Also, the driving of the throttle motor 13 is controlled by the ECU 100.

Specifically, the throttle opening degree of the throttle valve 12 is controlled so as to obtain an optimal intake air amount (target intake amount) according to the driving state of the engine 1, such as the engine speed detected by the engine speed sensor 201 and the amount that the accelerator pedal is pressed by the driver (accelerator opening degree). More specifically, the actual throttle opening degree of the throttle valve 12 is detected using the throttle opening degree sensor 202, and the throttle motor 13 for the throttle valve 12 is feedback-controlled such that the actual throttle opening degree matches the throttle opening degree to be obtained by the target intake amount (target throttle opening degree).

Also, an injector for fuel injection (fuel injection valve) 14 is disposed in the intake path 1d. A fuel pump supplies fuel from a fuel tank to the injector 14 at a predetermined pressure, and the injector 14 injects the fuel into the intake path 1d. The injected fuel mixes with intake air to produce an air-fuel mixture, which is then introduced into the combustion chamber 1c of the engine 1. The air-fuel mixture (fuel+air) introduced to the combustion chamber 1c combusts and explodes upon being ignited by the spark plug 15. The piston 1b moves back and forth due to the combustion and explosion of the air-fuel mixture in the combustion chamber 1c, and thus the crankshaft 11 rotates. The above-described driving state of the engine 1 is controlled by the ECU 100.

—Torque Converter—

Figure 3:
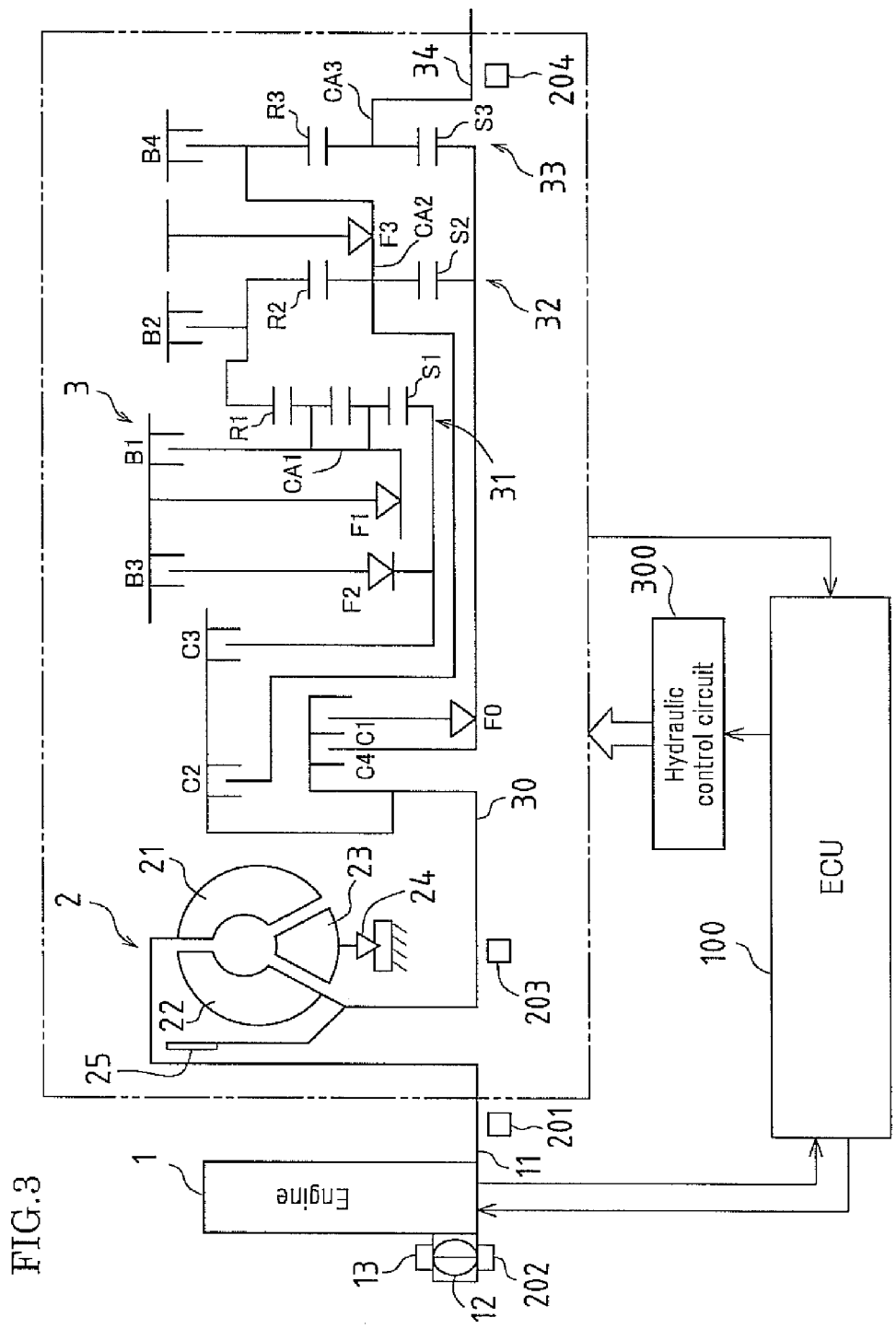
FIG. 3 is a diagram showing both a schematic configuration diagram of the engine, a torque converter, and an automatic transmission that are applied to the vehicle in FIG. 1 and a schematic configuration diagram of a control system.

As shown in FIG. 3, the torque converter 2 includes a pump impeller 21 on the input shaft side, a turbine runner 22 on the output shaft side, a stator 23 that performs a torque amplification function, and a one-way clutch 24, and the torque converter 2 transmits power via a fluid (hydraulic oil) between the pump impeller 21 and the turbine runner 22.

The torque converter 2 is provided with a lock-up clutch 25 that puts the input side and the output side into a directly connected state, and the pump impeller 21 and the turbine runner 22 rotate integrally when the lock-up clutch 25 is completely engaged. Also, when the lock-up clutch 25 is engaged in a predetermined slipping state, the turbine runner 22 rotates following the pump impeller 21 by a predetermined slip amount during driving. The torque converter 2 and the automatic transmission 3 are connected by a rotation shaft. The turbine speed of the torque converter 2 is detected by a turbine speed sensor 203. The engaging and releasing of the lock-up clutch 25 of the torque converter 2 is controlled by a hydraulic control circuit 300 and the ECU 100.

—Automatic Transmission—

As shown in FIG. 3, the automatic transmission 3 is a planetary gear type of transmission that has a double-pinion first planetary gear device 31, a single-pinion second planetary gear device 32, and a single-pinion third planetary gear device 33. Power that is output from the output shaft 34 of the automatic transmission 3 is transmitted to the drive wheels via a propeller shaft, a differential gear, a drive shaft, and the like.

A sun gear S1 of the first planetary gear device 31 of the automatic transmission 3 is selectively coupled to an input shaft 30 via a clutch C3. Also, the sun gear S1 is selectively coupled to the housing via a one-way clutch F2 and a brake B3, and rotation thereof in the reverse direction (the direction opposite that of the rotation of the input shaft 30) is prevented. A carrier CA1 of the first planetary gear device 31 is selectively coupled to the housing via a brake B1, and rotation thereof in the reverse direction is always prevented by a one-way clutch F1 that is provided in parallel with the brake B1. A ring gear R1 of the first planetary gear device 31 is integrally coupled with a ring gear R2 of the second planetary gear device 32, and is selectively coupled to the housing via a brake B2.

A sun gear S2 of the second planetary gear device 32 is integrally coupled to a sun gear S3 of the third planetary gear device 33, and is selectively coupled to the input shaft 30 via a clutch C4. Also, the sun gear S2 is selectively coupled to the input shaft 30 via a one-way clutch F0 and a clutch C1, and rotation thereof in the reverse direction relative to the input shaft 30 is prevented.

A carrier CA2 of the second planetary gear device 32 is integrally coupled with a ring gear R3 of the third planetary gear device 33, is selectively coupled to the input shaft 30 via a clutch C2, and is selectively coupled to the housing via a brake B4. Also, rotation of the carrier CA2 in the reverse direction is always prevented by a one-way clutch F3 provided in parallel with a brake B4. Also, a carrier CA3 of the third planetary gear device 33 is integrally coupled with the output shaft 34. The rotational speed of the output shaft 34 of the automatic transmission 3 is detected by an output speed sensor 204.

An operation table in FIG. 4 shows the engaged and released states of the above-described clutches C1 to C4, brakes B1 to B4, and one-way clutches F0 to F3 of the automatic transmission 3. In the operation table in FIG. 4, a circle indicates the engaged state, and a blank indicates the released state. Also, a double circle indicates the engaged stated during engine braking, and a triangle indicates an engaged state that is unrelated to power transmission.

As shown in FIG. 4, in the first speed (1st) of the forward gear stage in the automatic transmission 3 in this example, the clutch C1 is engaged, and the one-way clutches F0 and F3 operate. In the second speed (2nd) of the forward gear stage, the clutch C1 and the third brake B3 are engaged, and the one-way clutches F0, F1, and F2 operate.

In the third speed (3rd) of the forward gear stage, the clutches C1 and C3 are engaged, the brake B3 is engaged, and the one-way clutches F0 and F1 operate. In the fourth speed (4th) of the forward gear stage, the clutches C1, C2, and C3 are engaged, the brake B3 is engaged, and the one-way clutch F0 operates.

In the fifth speed (5th) of the forward gear stage, the clutches C1, C2, and C3 are engaged, and the brakes B1 and B3 are engaged. In the sixth speed (6th) of the forward gear stage, the clutches C1 and C2 are engaged, and the brakes B1, B2, and B3 are engaged. Also, in the reverse gear stage (R), the clutch C3 is engaged, the brake B4 is engaged, and the one-way clutch F1 operates.

As described above, with the automatic transmission 3 in this example, gear stages (gear ratios) are set by causing the clutches C1 to C4, the brakes B1 to B4, the one-way clutches F0 to F3, and the like, which are frictional engaging elements, to be engaged in predetermined states or released. The engaging and releasing of the clutches C1 to C4 and the brakes B1 to B4 is controlled by the hydraulic control circuit 300 and the ECU 100 (see FIGS. 1 and 2).

—Shift Operation Device—

Meanwhile, a shift operation device 5 such as that shown in FIG. 5(a) is disposed in the vicinity of the driver seat of the vehicle. The shift operation device 5 is provided with a displaceable shift lever 51.

With the shift operation device 5 of this example, a P (parking) range, an R (reverse) range, an N (neutral) range, and a D (drive) range are set, and the driver can displace the shift lever 51 to a desired range position. The positions of the P range, the R range, the N range, and the M range (also including an up-shift (+) position and a down-shift (−) position in the M range that are described later) are detected by a shift position sensor 206 (see FIG. 7). An output signal from the shift position sensor 206 is input to the ECU 100. Note that the ECU 100 can determine whether the automatic gear shift mode or the manual gear shift mode has been selected based on the output signal from the shift position sensor 206 and operation signals from an up-shift switch 511 and a down-shift switch 512 that are described later.

The P range and the N range are non-traveling ranges that are selected when the vehicle is not caused to travel, and the R range and the D range are traveling ranges that are selected when the vehicle is caused to travel.

As shown in FIG. 4, when the P range is selected by the shift lever 51, the clutches C1 to C4, the brakes B1 to B4, and the one-way clutches F0 to F3 of the automatic transmission 3 are all released, and the output shaft 34 is locked by a parking mechanism (not shown). When the N range is selected, the clutches C1 to C4, the brakes B1 to B4, and the one-way clutches F0 to F3 of the automatic transmission 3 are all released.

When the D range is selected, the automatic gear shift mode, in which gear shifting of the automatic transmission 3 is automatically performed according to the driving state of the vehicle and the like, is set, and gear shifting of the forward gear stages (six forward speeds) of the automatic transmission 3 is automatically controlled. Also, when the R range is selected, the automatic transmission 3 is switched to the reverse gear stage.

Also, as shown in FIG. 5(*b*), the shift operation device 5 is provided with an M (manual) range 52, and when the shift lever 51 is operated to the M range 52, the manual gear shift mode (sequential mode), in which gear shift operations are performed manually, is set. When the shift lever 51 is operated to the up-shift (+) or down-shift (−) positions in this manual gear shift mode, the forward gear stage of the automatic transmission 3 is shifted up or down. Specifically, the gear stage is shifted up one stage at a time (e.g., 1st→2nd→ ... →6th) each time the shift lever 51 is operated to the up-shift (+) position. On the other hand, the gear stage is shifted clown one stage at a time (e.g., 6th→5th→ ... →1st) each time the shift lever 51 is operated to the downshift (−) position.

Figure 6:
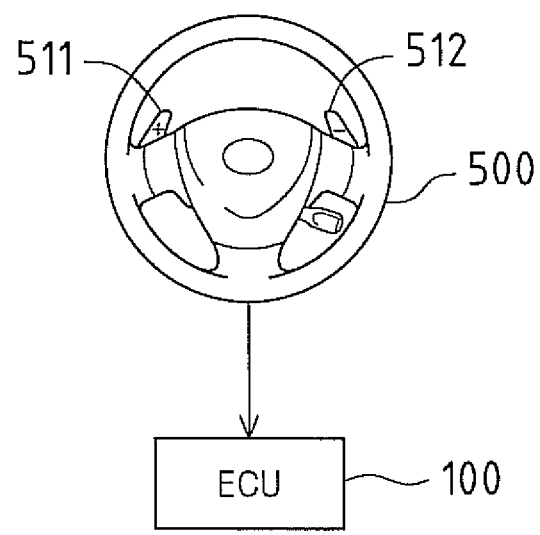
FIG. 6 is a diagram showing a steering wheel provided with an up-shift switch and a down-shift switch.

Also, as shown in FIG. 6, in this example, a steering wheel 500 disposed in front of the driver seat of the vehicle is provided with the up-shift switch 511 and the down-shift switch 512. The up-shift switch 511 and the down-shift switch 512 are, for example, paddle switches (momentary switches (automatically returning switches)), and operation signals from the up-shift switch 511 and the down-shift switch 512 are input to the ECU 100.

Then, in the case where the shift lever 51 has been operated to the D range for example, if the down-shift switch 512 is operated, the gear stage of the automatic transmission 3 is shifted down one stage at a time (e.g., 6th→5th→4th→ ... →1st) each time the down-shift switch 512 is operated. On the other hand, the gear stage of the automatic transmission 3 is shifted up (e.g., 1st→2nd→3rd→ ... →6th) each time the up-shift switch 511 is operated.

Here, in this example, as described above, while the shift lever 51 is operated to the D range position, the automatic gear shift mode is set, and while the automatic gear shift mode is set, automatic gear shift operations are performed in which the gear stage of the stepped automatic transmission 3 is selected according to gear shift map (see FIG. 8) such as that described later. Also, if the shift switch 511 or 512 is operated while the automatic gear shift mode is set, the gear shift mode is switched to the manual gear shift mode. Also, if the shift lever 51 is operated to the M range 52, the gear shift mode is switched to the manual gear shift mode.

On the other hand, a switch from the manual gear shift mode to the automatic gear shift mode is made according to an operation of the shift lever 51 to the D range position, for example. Also, after a switch to the manual gear shift mode, if a "condition for reversion to the automatic gear shift mode" is satisfied, such as the shift switches 511 and 512 not being operated for a predetermined time period, or an increase in the depression amount of the accelerator pedal 11, the gear shift mode reverts to automatic gear shift operations in accordance with the gear shift map (see FIG. 8).

In this way, in this example, it is possible to selectively switch between the automatic gear shift mode and the manual gear shift mode. Furthermore, in the configuration of this example, as shown in FIGS. 10 to 14, the drive force characteristics are different under the same conditions (same vehicle speed and same accelerator opening degree) between the automatic gear shift mode and the manual gear shift mode. Specifically, in this configuration, when there is a switch between the automatic gear shift mode and the manual gear shift mode, the drive force characteristics are changed by controlling the output torque of the engine 1. The drive force characteristics diagrams in FIGS. 10 to 14 (also including the selectable gear stages) are converted into a map and stored in a ROM 102 of the ECU 100.

Note that processing for selecting the initial gear stage for the manual gear shift mode (M range) when the gear shift mode is switched from automatic to manual, and processing for selecting the initial gear stage for the automatic gear shift mode (D range) when the gear shift mode is switched from manual to automatic will be described later.

—ECU—

Figure 7:
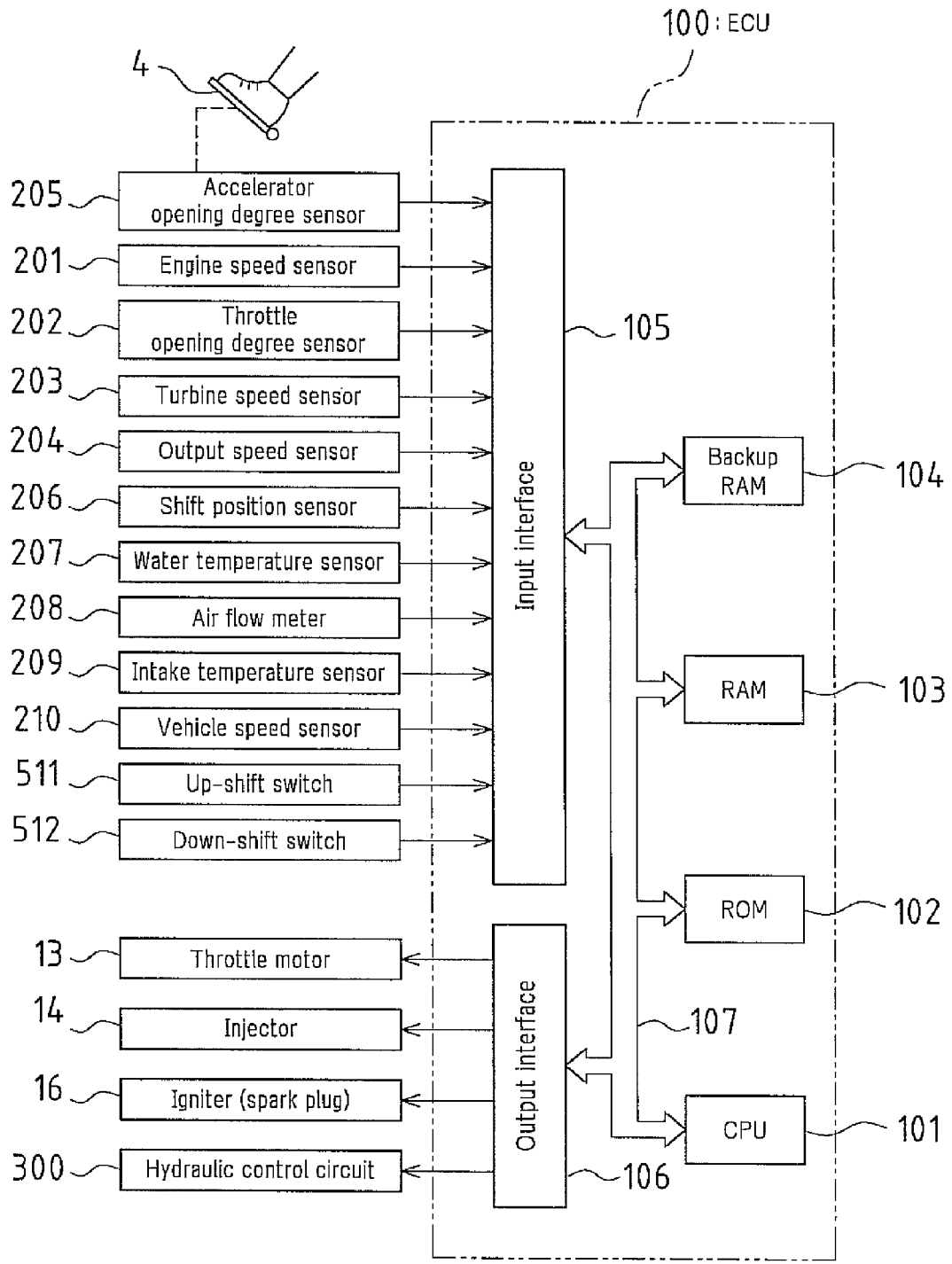
FIG. 7 is a block diagram showing a configuration of a control system such as an ECU.

As shown in FIG. 7, the ECU 100 includes a CPU 101, the ROM 102, a RAM 103, a backup RAM 104, and the like.

Various types of programs and the like are stored in the ROM 102, including programs for executing control related to basic driving of the vehicle, as well as executing gear shift control for setting the gear stage of the automatic transmission 3 according to the traveling condition of the vehicle. The specific content of this gear shift control will be described later.

The CPU 101 executes arithmetic processing based on various types of control programs and maps that are stored in the ROM 102. Also, the RAM 103 is a memory for temporarily storing results of operations performed by the CPU 101, data input from sensors, and the like, and the backup RAM 104 is a non-volatile memory for storing data and the like that is to be saved when the engine 1 is stopped.

The CPU 101, the ROM 102, the RAM 103, and the backup RAM 104 are connected to each other via a bus 107, and are also connected to an input interface 105 and an output interface 106 via the bus 107.

Connected to the input interface 105 are the engine speed sensor 201, the throttle opening degree sensor 202, the turbine speed sensor 203, the output speed sensor 204, an accelerator opening degree sensor 205 for detecting the opening degree of an accelerator pedal 4, the shift position sensor 206, the water temperature sensor 207, the air flow meter 208, the intake temperature sensor 209, a vehicle speed sensor 210 for detecting the speed of the vehicle, the up-shift switch 511, the down-shift switch 512, and the like, and signals from these various types of sensors are input to the ECU 100.

Connected to the output interface 106 are the throttle motor 13 for the throttle valve 12, the injector 14, the igniter 16 for the spark plug 15, the hydraulic control circuit 300, and the like.

The ECU 100 executes various types of control of the engine 1 based on output signals from the various types of sensors described above, including control of the opening degree of the throttle valve 12 of the engine 1, ignition timing control (drive control of the igniter 16), fuel injection amount control (control of the opening and closing of the injector 14), and the like.

Also, the ECU 100 outputs a solenoid control signal (hydraulic instruction signal) for setting the gear stage of the automatic transmission 3 to the hydraulic control circuit 300. For example, the excitation and non-excitation of a linear solenoid valve or an ON-OFF solenoid valve of the hydraulic control circuit 300 is controlled based on the solenoid control signal, and the clutches C1 to C4, the brakes B1 to B4, the one-way clutches F0 to F3, and the like of the automatic transmission 3 are engaged in a predetermined state or released so as to achieve predetermined transmission gear stages (first speed to sixth speed).

Furthermore, the ECU 100 outputs a lock-up clutch control signal (hydraulic instruction signal) to the hydraulic control circuit 300. Based on this lock-up clutch control signal, a lock-up control valve or the like of the hydraulic control circuit 300 is controlled such that the lock-up clutch 25 of the torque converter 2 is engaged, semi-engaged, or released.

Next is a description of "gear shift control", "lock-up control", "control when the gear shift mode is switched from automatic to manual", and "control when the gear shift mode is switched from manual to automatic", which are executed by the above-described ECU 100.

—Gear Shift Control—

First, the gear shift map used in this example of gear shift control will be described with reference to FIG. 8.

Figure 8:
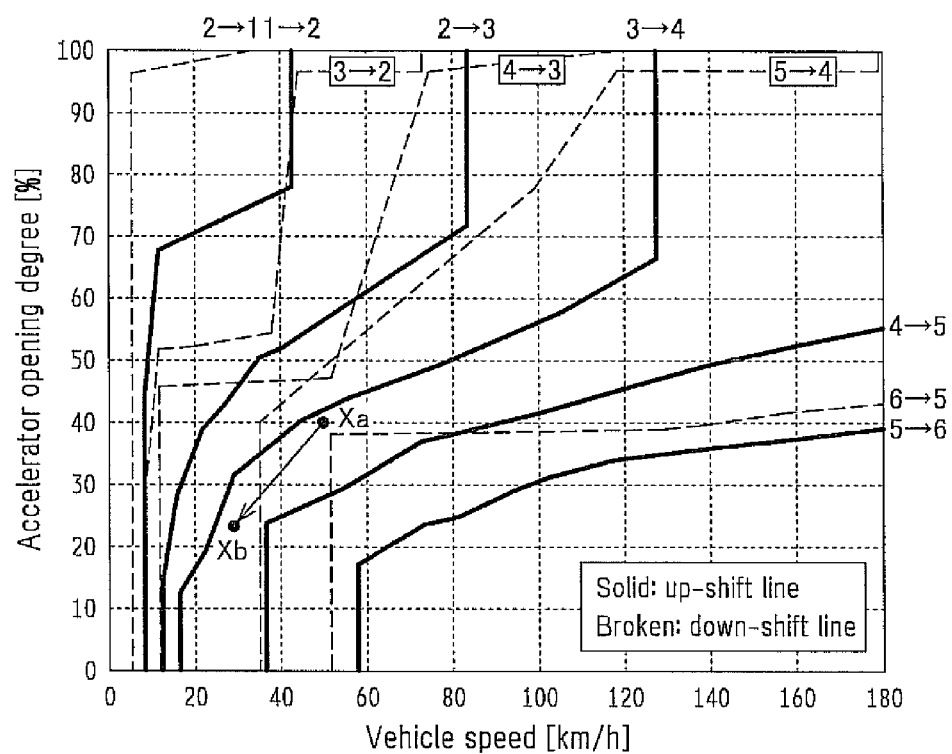
FIG. 8 is a diagram showing an example of a gear shift map.

The gear shift map shown in FIG. 8 is a map whose parameters are the vehicle speed and the accelerator opening degree, in which multiple areas are set for obtaining an optimum gear stage (gear stage achieving optimum fuel consumption) according to the vehicle speed and the accelerator opening degree, and this gear shift map is stored in the ROM 102 of the ECU 100. The areas of the gear shift map are demarcated by gear shift lines (gear stage switching lines).

Note that in the gear shift map shown in FIG. 8, up-shift lines (gear shift lines) are indicated by solid lines, down-shift lines (gear shift lines) are indicated by broken lines, and the switching direction of the up-shifts and the down-shifts is shown using numbers and arrows in the figure.

Next is a description of basic operations in gear shift control.

The ECU 100 calculates the vehicle speed from an output signal from the vehicle speed sensor 210, calculates the accelerator opening degree from an output signal from the accelerator opening degree sensor 205, calculates a target gear stage by referencing the gear shift map in FIG. 8 based on the vehicle speed and the accelerator opening degree, and determines whether a gear shift operation is necessary by comparing the target gear stage and the current gear stage.

In the case where the result of the determination is that a gear shift is not necessary (in the case where the target gear stage and the current gear stage are the same, and the gear stage has been appropriately set), a solenoid control signal (hydraulic instruction signal) for maintaining the current gear stage is output to the hydraulic control circuit 300.

On the other hand, gear shift control is performed in the case where the target gear stage and the current gear stage are different. For example, in the case where the traveling state of the vehicle changes, such as a change from point Xa to point Xb shown in FIG. 8, while traveling when the gear stage of the automatic transmission 3 is "fifth speed", this change crosses the down-shift gear shift line "5→4", and therefore the target gear stage calculated from the gear shift map is "fourth speed". A solenoid control signal (hydraulic instruction signal) for setting the fourth speed gear stage is then output to the hydraulic control circuit 300, and a gear shift from the fifth speed gear stage to the fourth speed gear stage (5→4 down-shift gear shift) is performed. Note that the vehicle speed may be calculated from an output signal from the output speed sensor 204.

Also, under control of the ECU 100, in the case where the shift lever 51 is operated to the up-shift (+) or down-shift (−) position in the manual gear shift mode, or the up-shift switch 511 or the clown-shift switch 512 is operated, a solenoid control signal (hydraulic instruction signal) that is in accordance with the manual gear shift request is output to the hydraulic control circuit 300, and the gear stage of the automatic transmission 3 is set.

—Lock-Up Control—

The ECU 100 engages or releases the lock-up clutch 25 by referencing a well-known engagement map (map in which engagement regions, release regions, and slip states are demarcated by switch lines) based on the vehicle speed and the accelerator opening degree, which are obtained from sensor output signals from the vehicle speed sensor 210 and the accelerator opening degree sensor 205.

Specifically, in the case where the vehicle speed changes toward the high vehicle speed side or the accelerator opening degree changes to the low accelerator opening degree side while the lock-up clutch 25 is in the released state, a lock-up on line of the engagement map is crossed, and therefore the lock-up clutch 25 is engaged. On the other hand, in the case where the vehicle speed changes toward the low vehicle speed side or the accelerator opening degree changes to the high accelerator opening degree side while the lock-up clutch 25 is in the engaged state, a lock-up off line of the engagement map is crossed, and therefore the lock-up clutch 25 is released. Also, the lock-up clutch 25 is put into a slip state (semi-engaged state) when in the slip region of the engagement map.

—Control when Gear Shift Mode is Switched from Automatic to Manual—

Next is a description of specific examples ("Selection Processing Example 1-1" to "Selection Processing Example 1-3") of the case of selecting the initial gear stage for the manual gear shift mode when there is a switch from the automatic gear shift mode (D range) to the manual gear shift mode (M range), with reference to FIGS. 9 to 12.

Selection Processing Example 1-1

Figure 9:
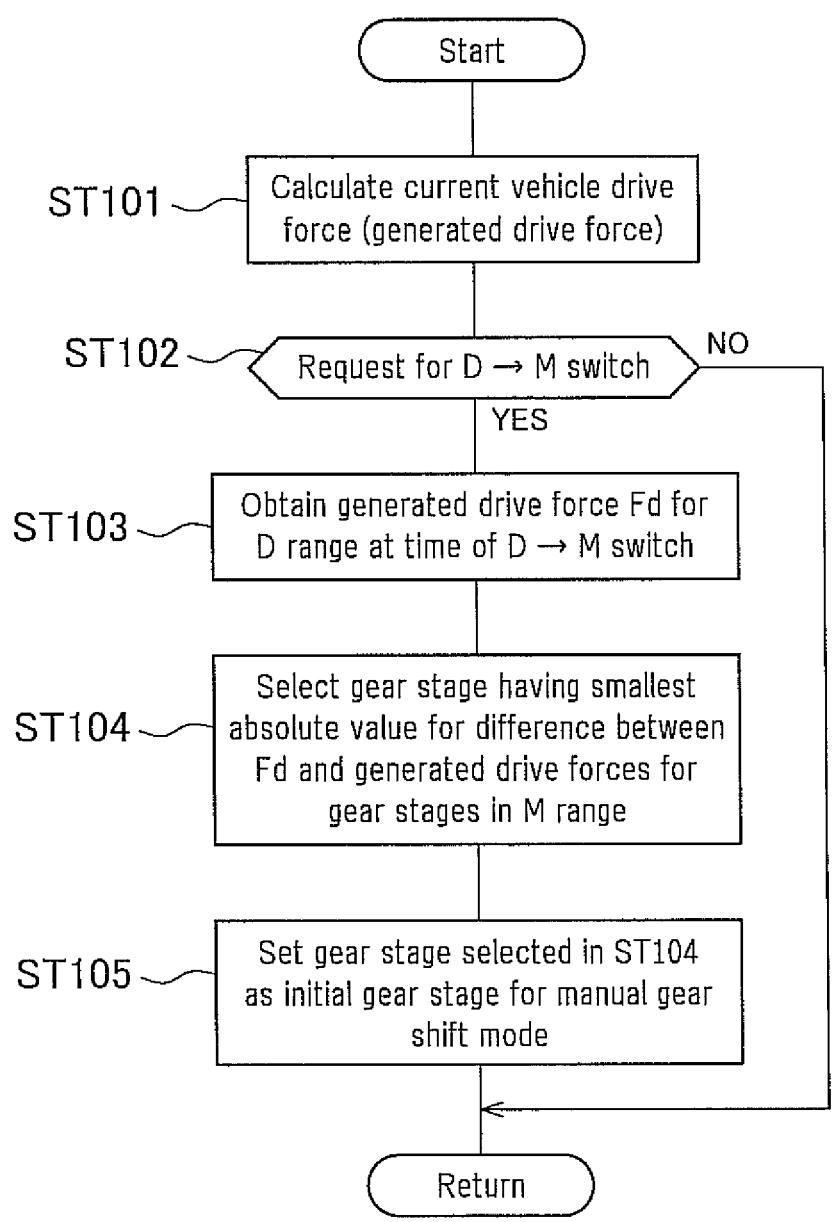
FIG. 9 is a flowchart showing an example of processing for selecting an initial gear stage for the manual gear shift mode when there is a switch in the gear shift mode from automatic to manual.

FIG. 9 is a flowchart showing an example of processing for selecting the initial gear stage when there is a switch from the automatic gear shift mode to the manual gear shift mode (D→M switch). This control routine in FIG. 9 is repeatedly executed by the ECU 100 at a predetermined cycle (e.g., approximately several msec to several tens of msec).

First, in step ST101, the current drive force of the vehicle (generated drive force that is generated by the drive wheels) is calculated. Specifically, (1) the engine speed and intake air amount are read from output signals from the engine speed sensor 201 and the air flow meter 208, and the output torque of the engine 1 is calculated by referencing a well-known map or the like based on the engine speed and the intake air amount. Then (2) the drive force of the vehicle (hereinafter, also referred to as "generated drive force") is calculated based on the output torque of the engine 1 that was calculated, the gear ratio of the current gear stage of the automatic transmission 3 (the gear ratio of the current gear stage in the D range), the drive wheel diameter, and the like.

In step ST102, it is determined whether there is a request for a switch from the automatic gear shift mode to the manual gear shift mode (D→M switch request) based on an output signal from the shift position sensor 206 and operation signals from the up-shift switch 511 and the down-shift switch 512, and the procedure returns in the case where the determination result is a negative determination (NO). In the case where the determination result is an affirmative determination (YES) in step ST102 (in the case of a D→M switch request), the procedure proceeds to step ST103.

In step ST103, a generated drive force Fd is obtained for the gear stage (gear stage in the D range) in the automatic gear shift mode when there is to be a switch from the automatic gear shift mode to the manual gear shift mode (D→M switch). In other words, the current (most recent) generated drive force Fd that was calculated in step ST101 is obtained.

In step ST104, the difference is obtained between the generated drive force Fd that was obtained in step ST103 and the generated drive force of each gear stage in the M range (see FIG. 10), and the gear stage (gear stage in the M range) for which the absolute value of the drive force difference is the lowest is selected. The gear ratio selected in this way is then set as the initial gear stage for the manual gear shift mode (M range) when the gear shift mode is switched (step ST105).

Figure 10:
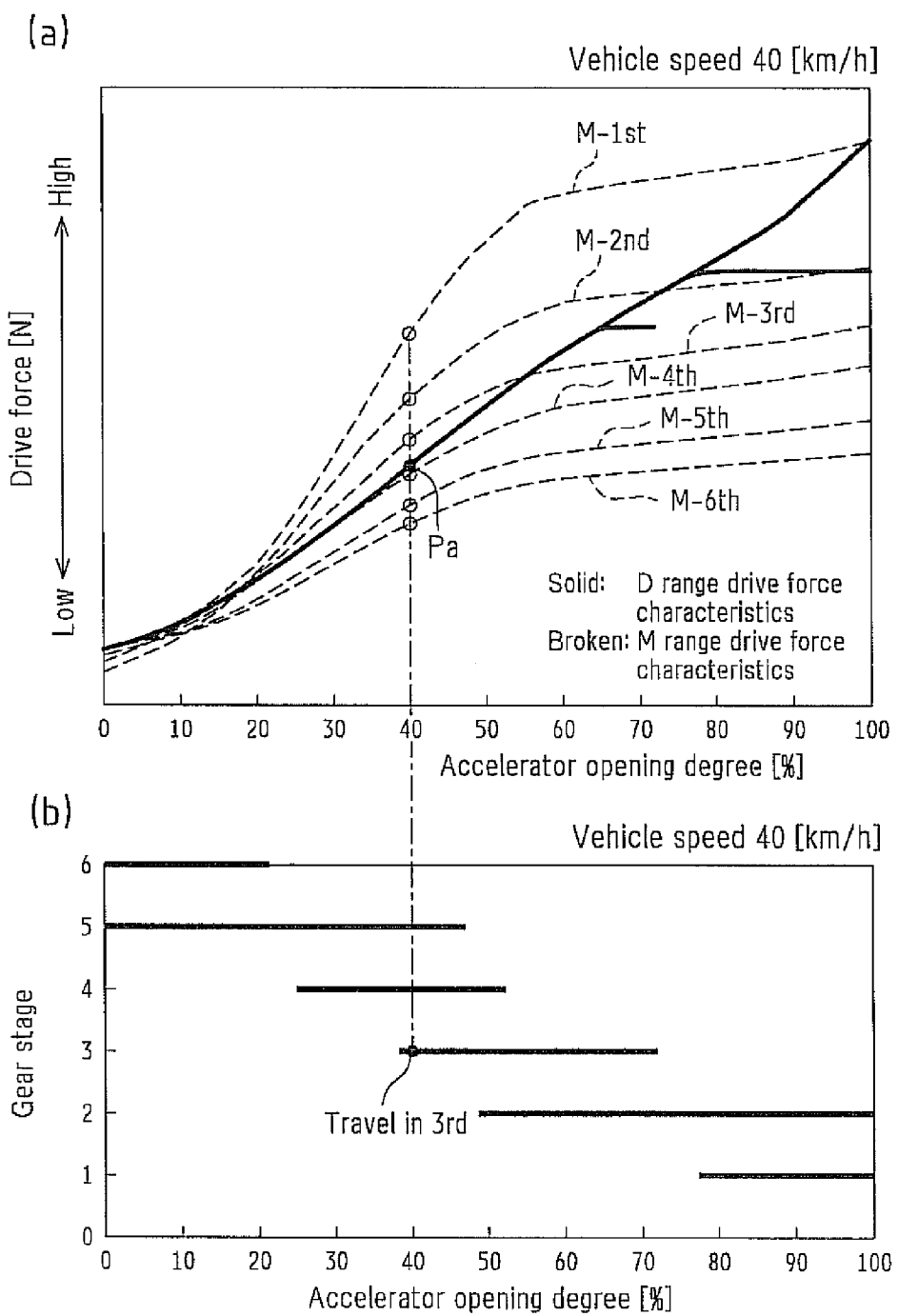
FIG. 10 is a diagram showing a specific example of the initial gear stage selection processing in FIG. 9.

The following describes specific processing in this example with reference to FIG. 10.

FIG. 10(a) shows drive force characteristics for the automatic gear shift mode (D range) and drive force characteristics for the manual gear shift mode (M range) at the vehicle speed of 40 [km/h]. Also, FIG. 10(b) shows the gear stages that can possibly be selected in the automatic gear shift mode (D range) at the vehicle speed of 40 [km/h]. Note that the gear stages that can possibly be selected in FIG. 10(b) have been set based on the gear shift map (gear shift lines) in FIG. 8.

Figure 18:
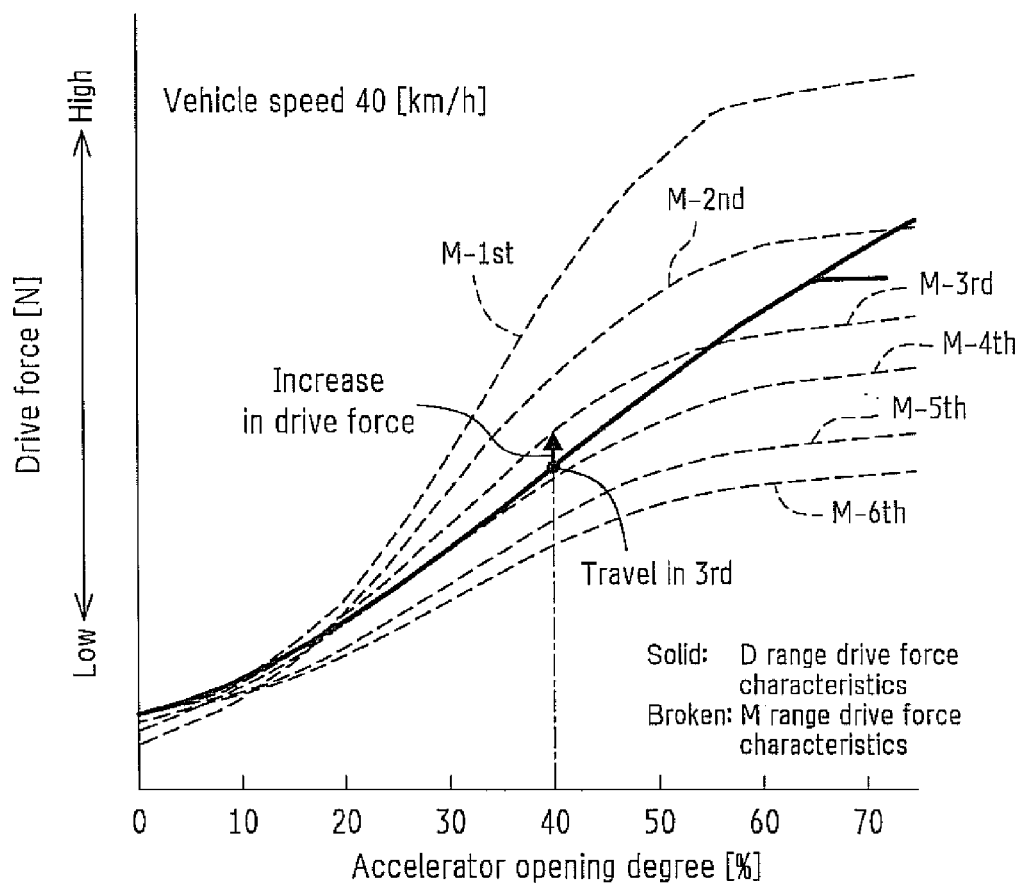
FIG. 18 is a diagram showing an example of the case where a sudden change in drive force occurs when there is a switch in the gear shift mode from automatic to manual.

First, according to conventional control, as shown in FIG. 18 described above, in the case where the third speed is selected in the automatic gear shift mode (D range) while traveling with a vehicle speed of 40 [km/h] and an accelerator opening degree of 40[%], and then there is a switch from the automatic gear shift mode to the manual gear shift mode (M range), the gear stage that was selected in the automatic gear shift mode immediately before the gear shift mode switch operation is set as the initial gear stage for the manual gear shift mode, and therefore the third speed (M-3rd) is selected as the initial gear stage for the manual gear shift mode to which the gear shift mode is switched. For this reason, the drive force increases when the gear shift mode is switched from automatic to manual, and there are cases where the driver feels a sense of unpleasantness due to this sudden change in the drive force.

In contrast, in this example, as shown in FIG. 10, in the case where the third speed is selected in the automatic gear shift mode (D range) (the driving point in the D range is in the Pa state) while traveling with a vehicle speed of 40 [km/h] and an accelerator opening degree of 40[%], and then there is a switch from the automatic gear shift mode (D range) to the manual gear shift mode (M range), the gear stage that is selected as the initial gear stage for the manual gear shift mode (M range) is, among the gear stages that can possibly be selected (selection candidate gear stages) in the manual gear shift mode (M range), the gear stage having the lowest absolute value for the difference between the above-described current generated drive force Fd and the generated drive force for the gear stages in the M range when the gear shift mode is switched, that is to say, [M-4th] is selected (processing of steps ST101 to ST105 in FIG. 9). According to this selection processing, as shown in FIG. 10(a), there is almost no sudden change in the drive force when the gear shift mode is switched from the automatic gear shift mode to the manual gear shift mode, thus preventing giving the driver a feeling of unpleasantness.

Selection Processing Example 1-2

Figure 11:
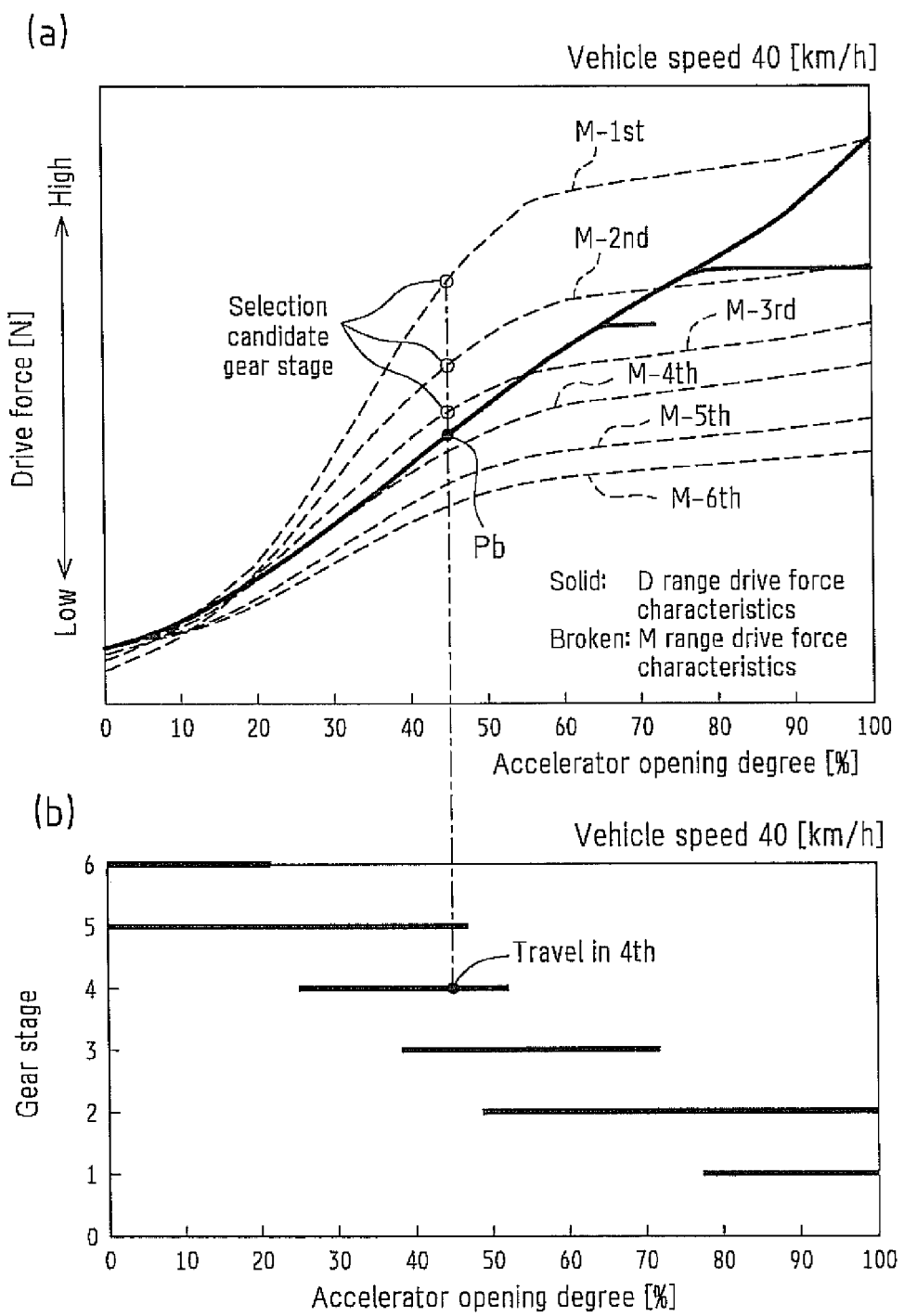
FIG. 11 is a diagram showing another example of processing for selecting an initial gear stage for the manual gear shift mode when there is a switch in the gear shift mode from automatic to manual.

The following describes another example of processing for selecting an initial gear stage when there is a switch from the automatic gear shift mode to the manual gear shift mode, with reference to FIG. 11.

Note that the drive force characteristics (vehicle speed=40 [km/h]) shown in FIG. 11(a) and the gear stages that can possibly be selected (vehicle speed=40 [km/h]) shown in FIG. 11(b) are respectively the same as in FIGS. 10(a) and 10(b) described above.

In this example, in the case where the fourth speed is selected in the automatic gear shift mode (D range) (the driving point in the D range is the Pb state) while traveling with a vehicle speed of 40 [km/h] and an accelerator opening degree of 45[%], and then there is a switch from the automatic gear shift mode (D range) to the manual gear shift mode (M range), the gear stage that is selected if the driver intends to accelerate is a gear stage (gear stage in the M range) according to which there is an increase in the amount of change in the drive force when the gear shift mode is switched.

Specifically, in the case of the example shown in FIG. 11, when there is a switch from the driving point being in the Pb state to the manual gear shift mode (M range), the three gear stages [M-3rd], [M-2nd], and [M-1st] are selectable gear stages (selection candidate gear stages) in the manual gear shift mode (M range) according to which the generated drive force changes in the direction of increasing. Among these three gear stages [M-3rd], [M-2nd], and [M-1st], the [M-3rd] gear stage having the lowest amount of change in the generated drive force is set as the initial gear stage for the manual gear shift mode when the gear shift mode is switched.

Due to selecting the initial gear stage for the manual gear shift mode in this way, the drive force is higher than when in the automatic gear shift mode, but since the driver's intention is an intention to accelerate when the gear shift mode is switched, and the increase in drive force reflects the driver's intention, it is possible to suppress the situation in which the driver feels a sense of unpleasantness.

Here, the determination regarding the driver's intention to accelerate is performed by, for example, comparing a predetermined determination threshold value and the accelerator opening degree (amount that the accelerator pedal is pressed) obtained from the output signal from the accelerator opening degree sensor 205, determining "intention to accelerate" if the accelerator opening degree is greater than the determination threshold value, and determining "no intention to accelerate" if the accelerator opening degree is less than or equal to the determination threshold value. In this case, the determination threshold value for the determination regarding an intention to accelerate is a value for determining whether an acceleration operation was performed more aggressively compared to normal traveling or steady traveling on a flat road, for example, and needs only be set to a value empirically obtained in advance through experimentation, simulation, or the like.

Also, the determination regarding the driver's intention to accelerate can be performed by determining "intention to accelerate" in the case where the amount of change in the accelerator opening degree (amount of change per unit time)

is greater than a predetermined determination threshold value, and determining "no intention to accelerate" in the case where the amount of change in the accelerator opening degree is less than or equal to the determination threshold value. In this case as well, the determination threshold value needs only be set to a value empirically obtained in advance through experimentation, simulation, or the like.

Furthermore, the determination of whether the driver intends to accelerate may be made using both the above-described accelerator opening degree and amount of change in the accelerator opening degree.

Note that in this example, the gear stage having the lowest amount of change (amount of increase) in drive force among the selection candidate gear stages in the manual gear shift mode (M range) is selected in the case where the driver intends to accelerate. However, a configuration is possible in which a gear stage according to which there is a higher amount of change in drive force is selected, according the amount of acceleration requested by the driver (amount of requested drive force) or the like, as the initial gear stage for the manual gear shift mode when the gear shift mode is switched.

Also, in this example, in the case where there is only one gear stage (gear stage in the M range) according to which there is an increase in the amount of change in drive force when the gear shift mode is switched from automatic to manual, that gear stage is set as the initial gear stage for the manual gear shift mode.

Selection Processing Example 1-3

Figure 12:
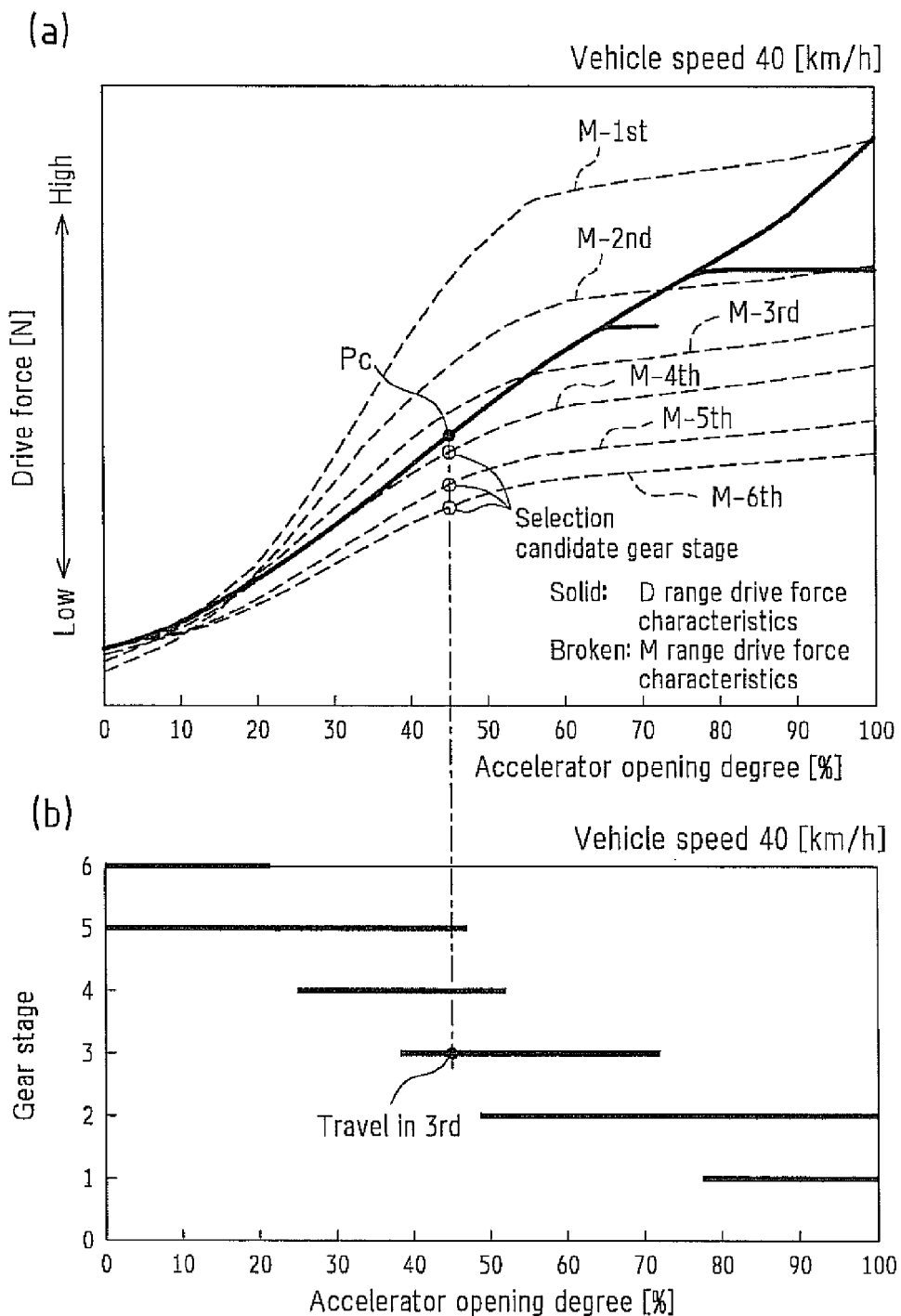
FIG. 12 is a diagram showing still another example of processing for selecting an initial gear stage for the manual gear shift mode when there is a switch in the gear shift mode from automatic to manual.

The following describes yet another example of processing for selecting an initial gear stage when there is a switch from the automatic gear shift mode to the manual gear shift mode, with reference to FIG. 12.

Note that the drive force characteristics (vehicle speed=40 [km/h]) shown in FIG. 12(a) and the gear stages that can possibly be selected (vehicle speed=40 [km/h]) shown in FIG. 12(b) are respectively the same as in FIGS. 10(a) and 10(b) described above.

In this example, in the case where the third speed is selected in the automatic gear shift mode (D range) (the driving point in the D range is the Pc state) while traveling with a vehicle speed of 40 [km/h] and an accelerator opening degree of 45[%], and then there is a switch from the automatic gear shift mode (D range) to the manual gear shift mode (M range), the gear stage that is selected if the driver intends to decelerate is a gear stage (gear stage in the M range) according to which there is a decrease in the amount of change in the drive force when the gear shift mode is switched.

Specifically, in the case of the example shown in FIG. 12, when there is a switch from the driving point being in the Pc state to the manual gear shift mode (M range), the three gear stages [M-4th], [M-5th], and [M-6th] are selectable gear stages (selection candidate gear stages) in the manual gear shift mode (M range) according to which the generated drive force changes in the direction of decreasing. Among these three gear stages [M-4th], and [M-6th], the [M-4th] gear stage having the lowest amount of change in the generated drive force is set as the initial gear stage for the manual gear shift mode when the gear shift mode is switched.

Due to selecting the initial gear stage for the manual gear shift mode in this way, the drive force is lower than when in the automatic gear shift mode, but since the driver's intention is an intention to decelerate when the gear shift mode is switched, and the decrease in drive force reflects the driver's intention, it is possible to suppress the situation in which the driver feels a sense of unpleasantness.

Here, in this example, the determination regarding the driver's intention to decelerate is performed by, for example, comparing a predetermined determination threshold value (negative value) and the accelerator opening degree (amount that the accelerator pedal is let up (negative value)) obtained from the output signal from the accelerator opening degree sensor 205, determining "intention to decelerate" if the accelerator opening degree is less than the determination threshold value, and determining "no intention to decelerate" if the accelerator opening degree is greater than or equal to the determination threshold value (negative value). In this case, the determination threshold value for the determination regarding an intention to decelerate is a value for determining whether a deceleration operation was performed more aggressively compared to normal traveling or steady traveling on a flat road, for example, and needs only be set to a value empirically obtained in advance through experimentation, simulation, or the like.

Also, the determination regarding the driver's intention to decelerate can be performed by determining "intention to decelerate" in the case where the amount of change in the accelerator opening degree (amount of change per unit time (negative value)) is less than a predetermined determination threshold value (negative value), and determining "no intention to decelerate" in the case where the amount of change in the accelerator opening degree is greater than or equal to the determination threshold value (negative value). In this case as well, the determination threshold value needs only be set to a value empirically obtained in advance through experimentation, simulation, or the like.

Furthermore, the determination of whether the driver intends to decelerate may be made using both the above-described accelerator opening degree and amount of change in the accelerator opening degree.

Note that in this example, the gear stage having the lowest amount of change (amount of decrease) in drive force among the selection candidate gear stages in the manual gear shift mode (M range) is selected in the case where the driver intends to decelerate. However, a configuration is possible in which a gear stage according to which there is a higher amount of change in drive force is selected, according the amount of deceleration requested by the driver (amount of requested braking force) or the like, as the initial gear stage for the manual gear shift mode when the gear shift mode is switched.

Also, in this example, in the case where there is only one gear stage (gear stage in the M range) according to which the drive force changes so as to increase when the gear shift mode is switched from automatic to manual, that gear stage is set as the initial gear stage for the manual gear shift mode.

—Control when Gear Shift Mode is Switched from Manual to Automatic—

Figure 13:
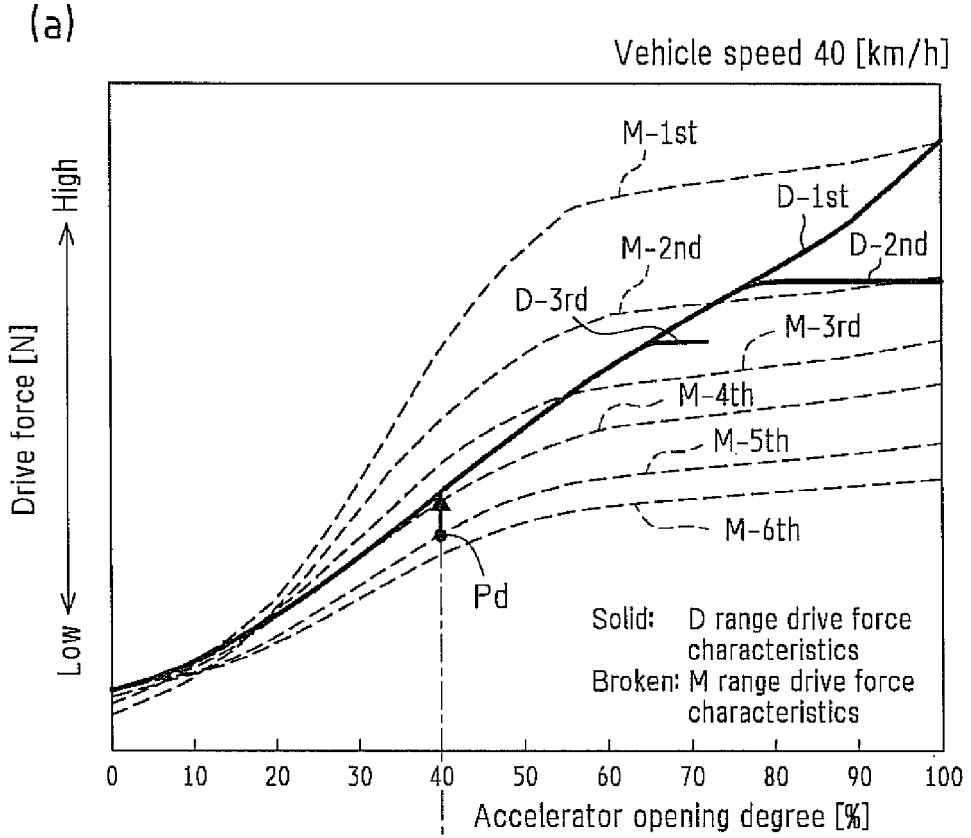
FIG. 13 is a diagram showing an example of processing for selecting an initial gear stage for the automatic gear shift mode when there is a switch in the gear shift mode from manual to automatic.
Figure 13:
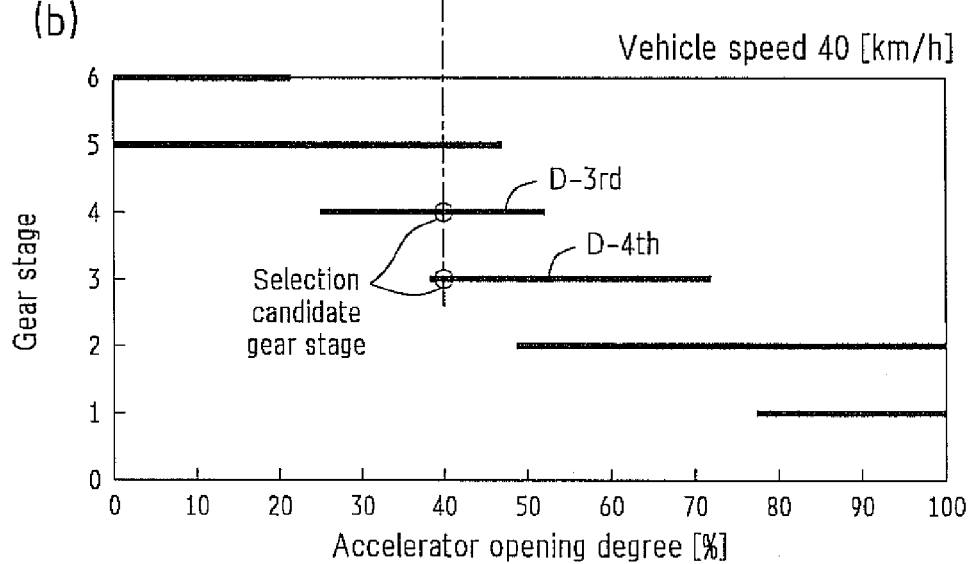
Figure 14:
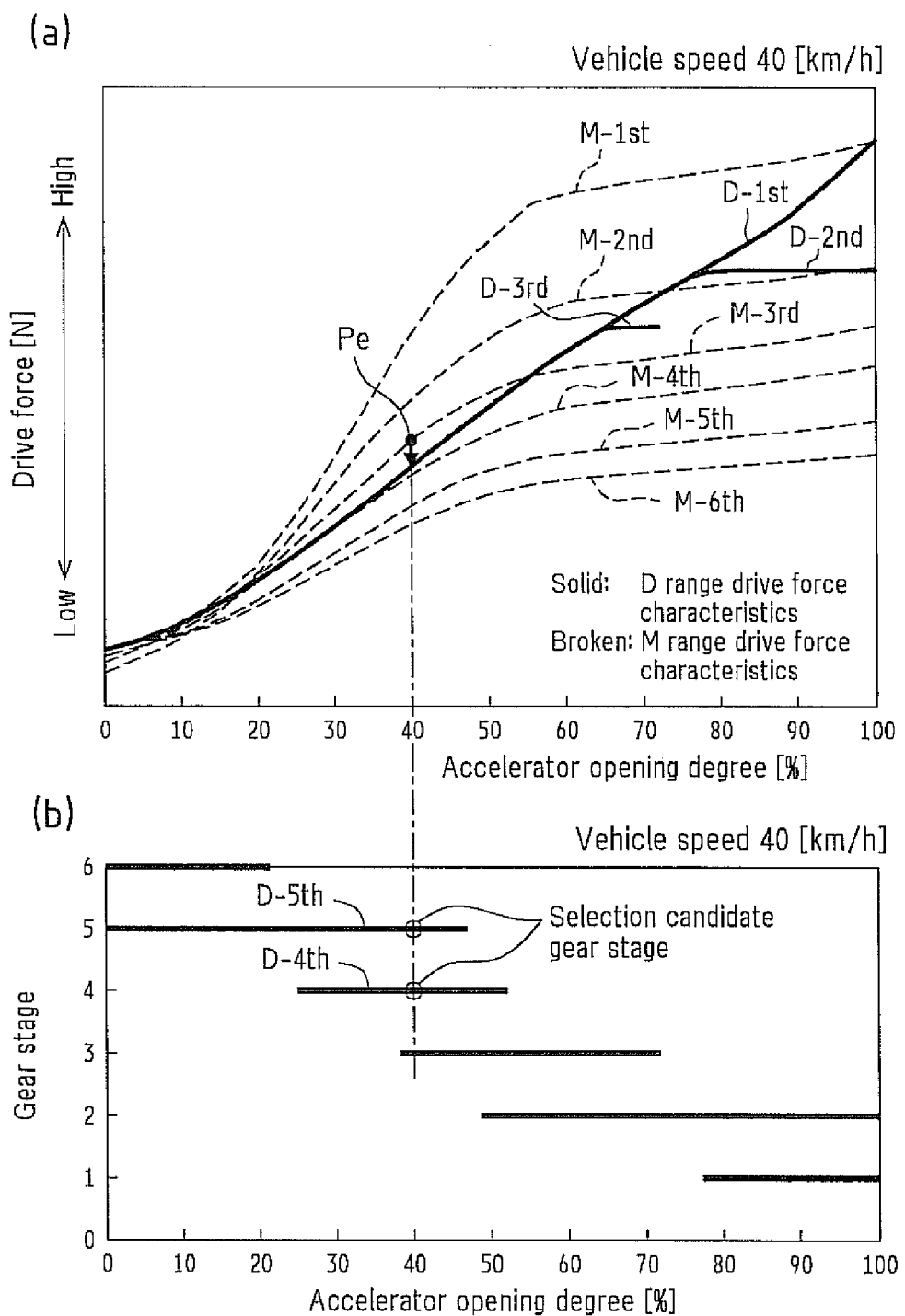
FIG. 14 is a diagram showing another example of processing for selecting an initial gear stage for the automatic gear shift mode when there is a switch in the gear shift mode from manual to automatic.
Figure 15:
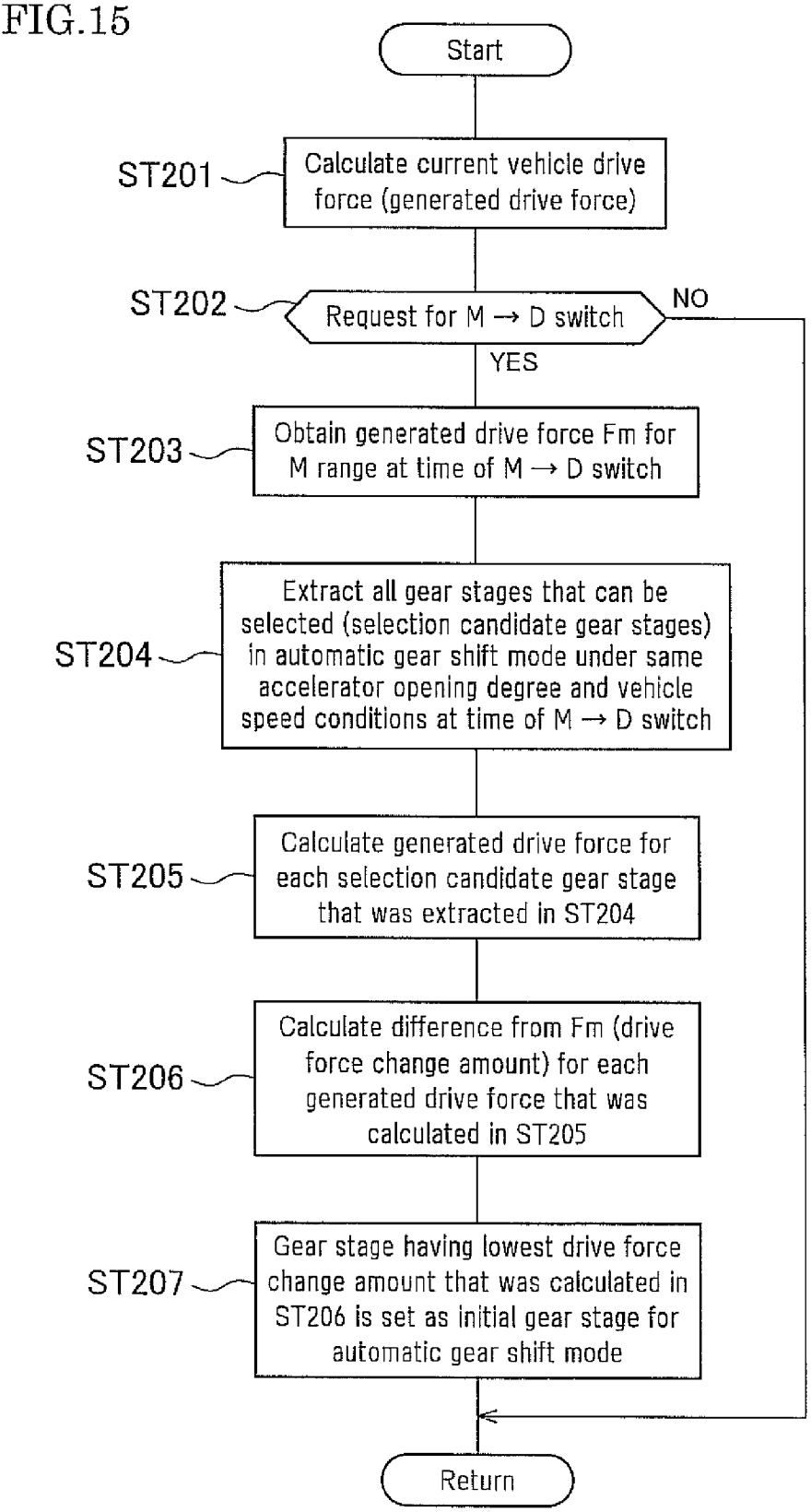
FIG. 15 is a flowchart showing another example of processing for selecting an initial gear stage for the automatic gear shift mode when there is a switch in the gear shift mode from manual to automatic.

The following describes specific examples of cases of selecting an initial gear stage for the automatic gear shift mode (D range) when there is a switch from the manual gear shift mode (M range) to the automatic gear shift mode (D range) ("Selection Processing Example 2-1" to "Selection Processing Example 2-3"), with reference to FIGS. 13 to 15.

Selection Processing Example 2-1

FIG. 13 is a diagram showing an example of processing for selecting an initial gear stage when there is a switch from the manual gear shift mode to the automatic gear shift mode.

Note that the drive force characteristics (vehicle speed=40 [km/h]) shown in FIG. 13(*a*) and the gear stages that can possibly be selected (vehicle speed=40 [km/h]) shown in FIG. 13(*b*) are respectively the same as in FIGS. 10(*a*) and 10(*b*) described above.

In this example, in the case where the fifth speed [M-5th] is selected in the manual gear shift mode (M range) (the driving point in the M range is the Pd state) while traveling with a vehicle speed of 40 [km/h] and an accelerator opening degree of 40[%], and then there is a switch from the manual gear shift mode (M range) to the automatic gear shift mode (D range), the gear stage that is selected in the case where the amount of change in drive force increases when the gear shift mode is switched is a gear stage (gear stage in the D range) according to which the engine speed changes in the direction of increasing.

Specifically, in the case of the example shown in FIG. 13, when there is a switch from the driving point being in the Pd state to the automatic gear shift mode (D range), the two gear stages [D-4th] and [D-3rd] are selectable gear stages (selection candidate gear stages) in the automatic gear shift mode (D range) according to which the engine speed changes in the direction of increasing. Between these two gear stages [D-4th] and [D-3rd], the [D-4th] gear stage having the lowest amount of change (amount of increase) in the engine speed is set as the initial gear stage for the automatic gear shift mode when the gear shift mode is switched.

Due to selecting the initial gear stage for the automatic gear shift mode in this way, the drive force is higher than when in the manual gear shift mode, but since a down-shift (increase in engine speed) occurs along with the rise in drive force, the gear shift mode switching processing can conform to the driver's expected sensation (increase in engine speed and increase in drive force). This enables suppressing the situation in which the driver feels a sense of unpleasantness.

Here, in this example, in the case where the drive force increases when the gear shift mode switches from manual to automatic, if there is only one selection candidate gear stage according to which the engine speed changes in the direction of increasing, that gear stage is set as the initial gear stage for the automatic gear shift mode.

Also, in this example, in the case where the drive force increases when the gear shift mode switches from manual to automatic, if there is no gear stage (gear stage in the D range) according to which the engine speed changes in the direction of increasing, the gear stage that is set as the initial gear stage for the automatic gear shift mode when the gear shift mode is switched is, among the selection candidate gear stages, the gear stage having the lowest amount of change in engine speed when the gear shift mode is switched.

Note that in this example, in the case where the selection candidate gear stages include gear stages according to which the drive force changes in the direction of increasing and decreasing, the gear stage having the lowest amount of change in drive force (absolute value) is set as the initial gear stage for the automatic gear shift mode when the gear shift mode is switched.

Selection Processing Example 2-2

The following describes another example of processing for selecting an initial gear stage when there is a switch from the automatic gear shift mode to the manual gear shift mode, with reference to FIG. 14.

Note that the drive force characteristics (vehicle speed=40 [km/h]) shown in FIG. 14(*a*) and the gear stages that can possibly be selected (vehicle speed=40 [km/h]) shown in FIG. 14(*b*) are respectively the same as in FIGS. 10(*a*) and 10(*b*) described above.

In this example, in the case where the third speed is selected in the manual gear shift mode (M range) (the driving point in the M range is the Pe state) while traveling with a vehicle speed of 40 [km/h] and an accelerator opening degree of 40[%], and then there is a switch from the manual gear shift mode (M range) to the automatic gear shift mode (D range), the gear stage that is selected in the case where the amount of change in drive force decreases when the gear shift mode is switched is a gear stage (gear stage in the D range) according to which the engine speed changes in the direction of decreasing.

Specifically, in the case of the example shown in FIG. 14, when there is a switch from the driving point being in the Pe state to the automatic gear shift mode (D range), the two gear stages [D-4th] and [D-5th] are selectable gear stages (selection candidate gear stages) in the automatic gear shift mode (D range) according to which the engine speed changes in the direction of decreasing. Between these two gear stages [D-4th] and [D-5th], the [D-4th] gear stage having the lowest amount of change (amount of decrease) in the engine speed is set as the initial gear stage for the automatic gear shift mode when the gear shift mode is switched.

Due to selecting the initial gear stage for the automatic gear shift mode in this way, the drive force is lower than when in the manual gear shift mode, but since an up-shift (decrease in engine speed) occurs along with the decrease in drive force, the gear shift mode switching processing can conform to the driver's expected sensation (decrease in engine speed and decrease in drive force). This enables suppressing the situation in which the driver feels a sense of unpleasantness.

Here, in this example, in the case where the drive force decreases when the gear shift mode switches from manual to automatic, if there is only one selection candidate gear stage according to which the engine speed changes in the direction of decreasing, that gear stage is set as the initial gear stage for the automatic gear shift mode.

Also, in this example, in the case where the drive force decreases when the gear shift mode switches from manual to automatic, if there is no gear stage (gear stage in the D range) according to which the engine speed changes in the direction of decreasing, the gear stage that is set as the initial gear stage for the automatic gear shift mode when the gear shift mode is switched is, among the selection candidate gear stages, the gear stage having the lowest amount of change in engine speed.

Note that in this example, in the case where the selection candidate gear stages include gear stages according to which the drive force changes in the direction of increasing and decreasing, the gear stage having the lowest amount of change in drive force (absolute value) is set as the initial gear stage for the automatic gear shift mode when the gear shift mode is switched.

Selection Processing Example 2-3

The following describes yet another example of processing for selecting an initial gear stage when there is a switch from the automatic gear shift mode to the manual gear shift mode, with reference to the flowchart of FIG. 15. This control routine in FIG. 15 is repeatedly executed by the ECU 100 at a predetermined cycle (e.g., approximately several msec to several tens of msec).

First, in step ST201, the current drive force of the vehicle (generated drive force that is generated by the drive wheels) is calculated. Specifically, (1) the engine speed and intake air amount are read from output signals from the engine speed sensor 201 and the air flow meter 208, and the output torque of the engine 1 is calculated by referencing a well-known map or the like based on the engine speed and the intake air amount. Then (2) the drive force of the vehicle (generated drive force) is calculated based on the output torque of the engine 1 that was calculated, the gear ratio of the current gear stage of the automatic transmission 3 (the gear ratio of the current gear stage in the M range), the drive wheel diameter, and the like.

In step ST202, it is determined whether there is a request for a switch from the manual gear shift mode to the automatic gear shift mode (M→D switch request) based on an output signal from the shift position sensor 206 and operation signals from the up-shift switch 511 and the down-shift switch 512, and the procedure returns in the case where the determination result is a negative determination (NO). In the case where the determination result is an affirmative determination (YES) in step ST202 (in the case of a M→D switch request), the procedure proceeds to step ST203.

In step ST203, a generated drive force Fm is obtained for the gear stage (gear stage in the M range) in the manual gear shift mode when there is to be a switch from the manual gear shift mode to the automatic gear shift mode (M→D switch). In other words, the current (most recent) generated drive force Fm that was calculated in step ST201 is obtained.

In step ST204, all of the selection candidate gear stages that can be selected in the automatic gear shift mode (D range) under the same conditions (same accelerator opening degree and same vehicle speed) as those at the time of the M→D switch are extracted.

In step ST205, the generated drive force is calculated for the respective cases where the selection candidate gear stages (gear stages in the D range) that were extracted in step ST204 are applied. Note that the generated drive force for each of the gear stages in the D range may be calculated using a pre-set map, or may be calculated based on the output torque of the engine 1, the gear ratios of the gear stages, the drive wheel diameter, and the like.

In step ST206, the difference (amount of change in drive force) is obtained between the generated drive force Fm that was obtained in step ST203 and the generated drive force of each selection candidate gear stage that was calculated in step ST205.

Then, in step ST207, the gear stage having the lowest amount of change in drive force that was calculated in step ST206 is selected as the initial gear stage for the automatic gear shift mode (D range).

The following describes specific processing in this example.

First, in the above-described drive force characteristics diagram shown in FIG. 13(*a*), the three gear stages [5th speed], [4th speed], and [3rd speed] are selectable gear stages in the automatic gear shift mode (D range) under the conditions of a vehicle speed of 40 [km/h] and an accelerator opening degree of 40[%], for example, and the generated drive force is the same in the drive force characteristics diagram of FIG. 13(*a*) regardless of which of these three gear stages is selected.

However, there are cases where depending on how the gear shift lines of the gear shift map are set (how the hysteresis between the up-shift lines and the down-shift lines and the like are set), the generated drive force differs for each selection candidate gear stage (e.g., [5th speed], [4th speed], and [3rd speed]) in the automatic gear shift mode (D range) in the drive force characteristics. For example, even in FIG. 13(*a*), there are cases where the generated drive force differs between [D-2nd] and [D-1st] under the same conditions (vehicle speed of 40 km and accelerator opening degree of 85[%]), even though these conditions are not the same as the above-described conditions (vehicle speed of 40 km and accelerator opening degree of 40[%]). There are also cases where the generated drive force differs between [D-3rd] and [D-2nd] under the same conditions (vehicle speed of 40 km and an accelerator opening degree of 70[%]), and there are cases where there are settings (combinations of gear shift lines) where these drive force characteristics exist in other gear stages (fourth speed to sixth speed) as well.

For example, take the case where there are the three gear stages [5th speed], [4th speed], and [3rd speed] as gear stages that can be selected in the automatic gear shift mode (D range) under the above conditions (conditions of a vehicle speed of 40 [km/h] and an accelerator opening degree of 40[%]), and the generated drive force is different for each of these selection candidate gear stages [5th speed], [4th speed], and [3rd speed]. In this case, according to the above-described selection processing of FIG. 15, the drive force is calculated for each case of applying the gear stages [D-5th], [D-4th], and [D-3rd] when there is to be a M→D switch, the difference is obtained between the generated drive force Fm in the M range at the time of the M→D switch and each of the calculated generated drive forces, and the gear stage having the lowest drive force difference is set as the initial gear stage for the automatic gear shift mode (D range) when the gear shift mode is switched. This selection processing enables suppressing a sudden change in drive force when there is a switch from the manual gear shift mode to the automatic gear shift mode, and enables preventing giving the driver a sense of unpleasantness.

Here, the above examples of FIGS. 10 to 14 show drive force characteristics in the automatic gear shift mode, drive force characteristics in the manual gear shift mode, and gear stages that are selectable in the automatic gear shift mode in the case where the vehicle speed is 40 [km/h]. However, in actuality the drive force characteristics and selectable gear stages (gear stages in the D range) in the modes shown in FIGS. 10 to 14 are, for example, set for predetermined vehicle speed increments (e.g., vehicle speed increments of "10 [km/h] or more and less than 20 [km/h]", "20 [km/h] or more and less than 30 [km/h]", "30 [km/h] or more and less than 40 [km/h]", . . . , "100 [km/h] or more and less than 110 [km/h]", and so on), and thus are set individually according to each vehicle speed. Note that a diagram of these drive force characteristics in vehicle speed increments (also including selectable gear stages) may also be mapped and stored in the ROM 102 of the ECU 100.

Embodiment 2

Figure 16:
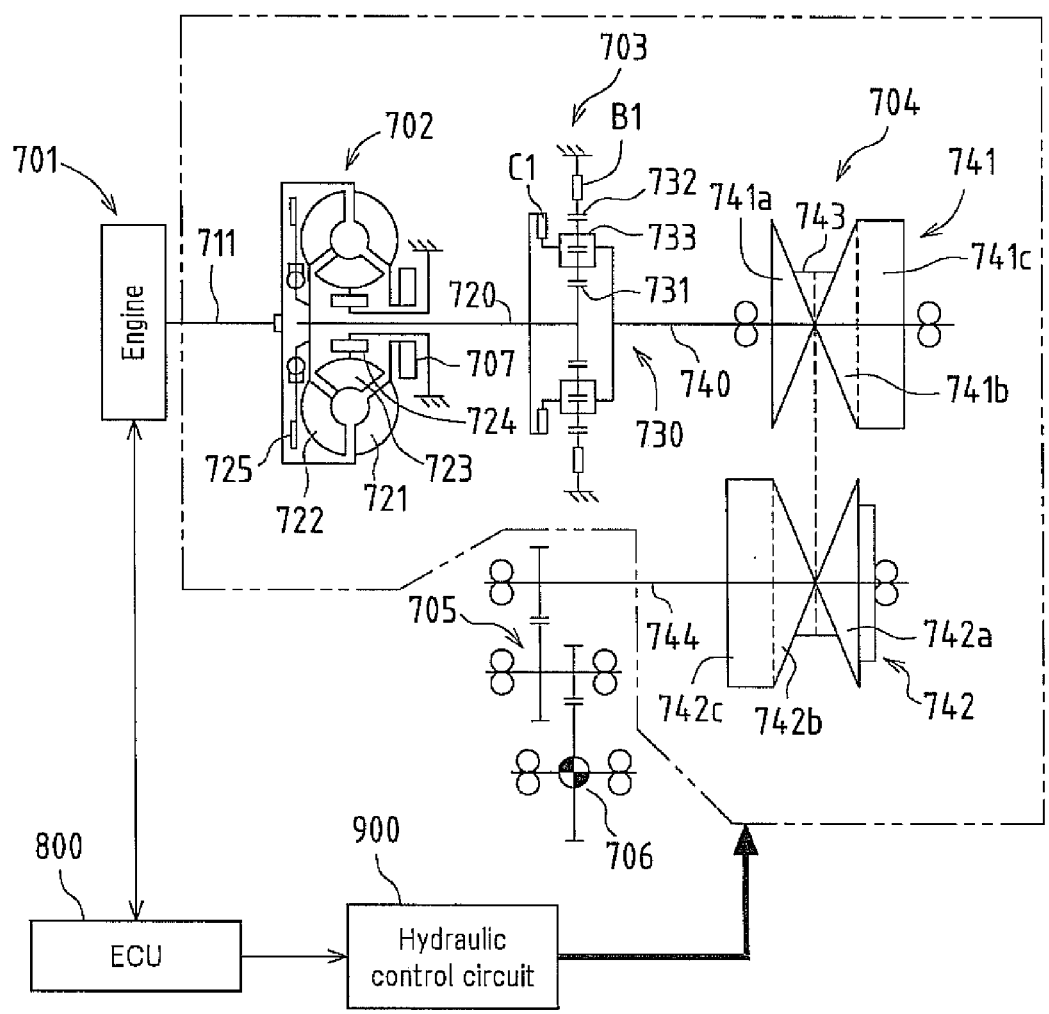
FIG. 16 is a schematic configuration diagram showing another example of a vehicle to which the present invention is applied.

FIG. 16 is a schematic configuration diagram showing another example of a vehicle to which the present invention is applied.

In this example, the vehicle is a front-engine, front-wheel drive (FF) vehicle that is equipped with an engine (internal combustion engine) 701 serving as the traveling power source, a torque converter 702, a forward/reverse switching device 703, a belt-type stepless transmission (CVT) 704, a deceleration gear device 705, a differential gear mechanism 706, an ECU 800, and the like. Note that the engine 701 may be the same as that shown in FIG. 2, or may be an engine having a different structure.

A crankshaft 711 serving as the output shaft of the engine 701 is coupled to the torque converter 702, and the output of the engine 701 is transmitted from the torque converter 702 to the differential gear mechanism 706 via the forward/reverse switching device 703, the belt-type stepless transmission 704, and the deceleration gear device 705, and then distributed to left and right drive wheels (not shown).

The following describes portions of the torque converter 702, the forward/reverse switching device 703, and the belt-type stepless transmission 704.

—Torque Converter—

The torque converter 702 has basically the same structure as that shown in FIG. 3. The torque converter 702 includes a pump impeller 721 on the input shaft side, a turbine runner 722 on the output shaft side, a stator 723 that performs a torque amplification function, and a one-way clutch 724, and the torque converter 702 transmits power via a fluid (hydraulic oil) between the pump impeller 721 and the turbine runner 722.

The torque converter 702 is also provided with a lock-up clutch 725 that puts the input side and output side of the torque converter 702 into a directly connected state, and the pump impeller 721 and the turbine runner 722 rotate integrally when the lock-up clutch 725 is completely engaged. Also, when the lock-up clutch 725 is engaged in a predetermined slipping state (semi-engaged state), the turbine runner 722 rotates following the pump impeller 721 by a predetermined slip amount during driving. On the other hand, the lock-up clutch 725 enters the released state when the lock-up differential pressure is set to negative. Note that the torque converter 702 is provided with a mechanical oil pump (hydraulic pressure generation source) 707 that is coupled to and driven by the pump impeller 721.

—Forward/Reverse Switching Device—

The forward/reverse switching device 703 includes a double-pinion planetary gear mechanism 730, a forward clutch (input clutch) C1, and a reverse brake B1.

A sun gear 731 of the planetary gear mechanism 730 is integrally coupled to a turbine shaft 720 of the torque converter 702, and a carrier 733 is integrally coupled to an input shaft 740 of the belt-type stepless transmission 704. The carrier 733 and the sun gear 731 are selectively coupled via the forward clutch C1. Also, a ring gear 732 is selectively fixed to the housing via the reverse brake B1.

The forward clutch C1 and the reverse brake B1 are hydraulic frictional engaging elements that are engaged and released by a hydraulic control circuit 900, and when the forward clutch C1 is engaged and the reverse brake B1 is released, the forward/reverse switching device 703 enters an integrated rotation state and a forward power transmission route is established (achieved), and forward drive force is transmitted to the belt-type stepless transmission 704 side in this state.

On the other hand, when the reverse brake B1 is engaged and the forward clutch C1 is released, a reverse power transmission route is established (achieved) by the forward/reverse switching device 703. In this state, the input shaft 740 rotates in the direction opposite to the turbine shaft 720, and this reverse drive force is transmitted to the belt-type stepless transmission 704 side. Also, when the forward clutch C1 and the reverse brake B1 are both released, the forward/reverse switching device 703 enters a neutral state (cut-off state) in which power transmission is cut off.

—Belt-Type Stepless Transmission—

The belt-type stepless transmission 704 includes a primary pulley 741 on the input side, a secondary pulley 742 on the output side, a metal belt 743 wound around the primary pulley 741 and the secondary pulley 742, and the like.

The primary pulley 741 is a variable pulley that has a variable effective diameter and is configured by a fixed sheave 741a that is fixed to the input shaft 740 and a movable sheave 741b that is disposed on the input shaft 740 so as to be capable of sliding in only the axial direction. Similarly, the secondary pulley 742 is also a variable pulley that has a variable effective diameter and is configured by a fixed sheave 742a that is fixed to the output shaft 744 and a movable sheave 742b that is disposed on the output shaft 744 so as to be capable of sliding in only the axial direction.

A hydraulic actuator 741c for changing the width of a V groove between the fixed sheave 741a and the movable sheave 741b is disposed on the movable sheave 741b side of the primary pulley 741. Similarly, a hydraulic actuator 742c for changing the width of a V groove between the fixed sheave 742a and the movable sheave 742b is disposed on the movable sheave 742b side of the secondary pulley 742.

In the belt-type stepless transmission 704 having the above structure, the hydraulic pressure of the hydraulic actuator 741c of the primary pulley 741 is controlled so as to change the width of the V grooves of the primary pulley 741 and the secondary pulley 742 and change the engaged diameter (effective diameter) of the belt 743, and thus the gear ratio γ (γ=primary pulley rotational speed (input shaft rotational speed) Nin/secondary pulley rotational speed (output shaft rotational speed) Nout) changes in a continuous manner. Also, the hydraulic pressure of the hydraulic actuator 742c of the secondary pulley 742 is controlled such that the belt 743 is gripped with a predetermined gripping force according to which belt slippage does not occur. Such control is executed by the ECU 800 and the hydraulic control circuit 900.

—Gear Shift Control—

Figure 17:
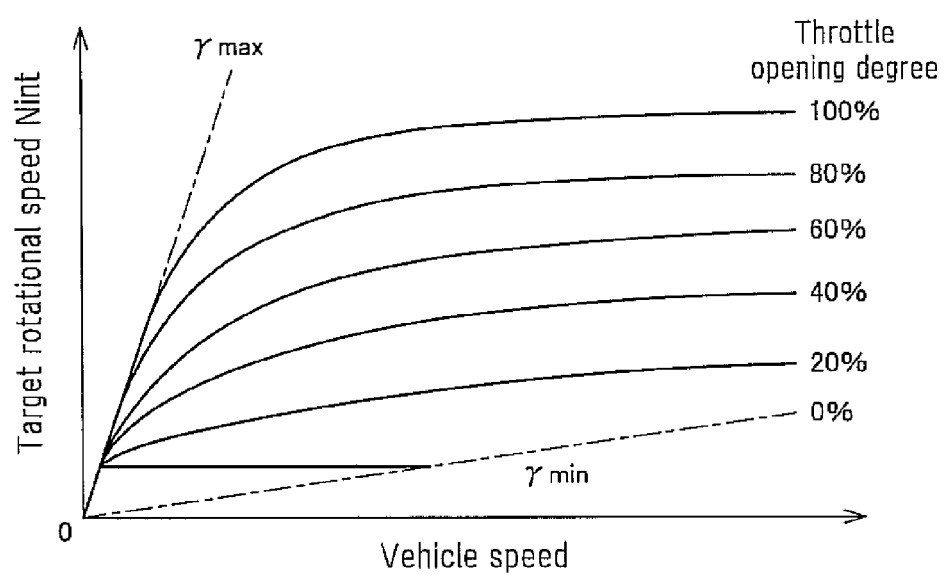
FIG. 17 is a diagram showing an example of a map used in gear shift control of a belt-type stepless transmission.

In this example, as shown in FIG. 17 for example, an input-side target rotational speed Nint is calculated from a pre-set gear shift map using the vehicle speed and accelerator operation amount (accelerator opening degree) that represents the amount of output requested by the driver as parameters, and the gear ratio γ is changed in a continuous manner such that an actual input shaft rotational speed Nin matches the target rotational speed Nint, by performing gear-shift control of the belt-type stepless transmission 704 according to the deviation between the rotational speeds (Nint−Nin).

Note that in the map in FIG. 17, the target rotational speed Nint is set such that the gear ratio γ increases as the vehicle speed decreases and the accelerator opening degree increases. Also, in the map in FIG. 17, since the vehicle speed corresponds to the rotational speed of the secondary pulley (output shaft rotational speed) Nout, the target rotational speed Nint serving as the target value for the rotational speed of the primary pulley (input shaft rotational speed) Nin corresponds to the target gear ratio and is set within the range of a minimum gear ratio γmin to a maximum gear ratio γmax of the belt-type stepless transmission 704.

Here, with the vehicle of this example as well, similarly to the above-described Embodiment 1, the automatic gear shift mode is achieved when the shift lever 51 (see FIG. 5) is operated to the D range position, and while the automatic gear shift mode is set, automatic gear shift operations are performed by the gear ratio of the belt-type stepless transmission 704 being selected according the above-described gear shift map (see FIG. 17). Also, if the shift switch 511 or 512 (see FIG. 6) is operated while the automatic gear shift mode (D range) is achieved, the gear shift mode is switched to the manual gear shift mode. Furthermore, if the shift lever 51 is operated to the M range 52, the gear shift mode is switched to the manual gear shift mode.

In this way, in this example as well, it is possible to selectively switch between the automatic gear shift mode and the manual, gear shift mode, and furthermore, similarly to the above-described Embodiment 1, the drive force characteristics are set differently under the same conditions (same vehicle speed and same accelerator opening degree) between the automatic gear shift mode and the manual gear shift mode.

Also, with the vehicle of this example as well, when there is a switch from the automatic gear shift mode to the manual gear shift mode, by using processing similar to the above-described "Selection processing example 1-1" of Embodiment 1 to select the initial gear ratio for the manual gear shift mode (M range) when the gear shift mode is switched, it is possible to diminish the sudden change in drive force when the gear shift mode is switched, and prevent giving the driver a sense of unpleasantness.

Also, when there is a switch from the automatic gear shift mode to the manual gear shift mode, by using processing similar to the above-described "Selection processing example 1-2" or "Selection processing example 1-3" of Embodiment 1 to select the initial gear ratio for the manual gear shift mode (M range) when the gear shift mode is switched, the change in drive force at the time of the gear shift mode switch is change that reflects the driver's intention (intention to accelerate or intention to decelerate), thus enabling suppressing a situation in which the driver feels a sense of unpleasantness.

Furthermore, with the vehicle of this example as well, when there is a switch from the manual gear shift mode to the automatic gear shift mode, by using processing similar to the above-described "Selection processing example 2-1" or "Selection processing example 2-2" of Embodiment 1 to select the initial gear ratio for the automatic gear shift mode (D range) when the gear shift mode is switched, even if the drive force increases or decreases when the gear shift mode is switched, the engine speed increases or decreases in accordance with the change in the drive force, thus enabling performing gear shift mode switching processing that conforms to the driver's expected sensation.

Also, when there is a switch from the manual gear shift mode to the automatic gear shift mode, by using processing similar to the above-described "Selection processing example 2-3" of Embodiment 1 to select the initial gear ratio for the automatic gear shift mode (D range) when the gear shift mode is switched, it is possible to diminish the sudden change in drive force when the gear shift mode is switched, and prevent giving the driver a sense of unpleasantness.

Other Embodiments

Although one of the above examples (Embodiment 1) describes the example where the present invention is applied to control of a vehicle equipped with an automatic transmission that has six forward speeds, the present invention is not limited to this and can also be applied to control of a vehicle equipped with a stepped automatic transmission that has any other number of gear stages.

Although one of the above examples (Embodiment 2) describes the example where the present invention is applied to control of a vehicle equipped with a belt-type stepless transmission, the present invention is not limited to this and can also be applied to control of a vehicle equipped with another type of stepless transmission such as a toroidal stepless transmission.

Although the example where the present invention is applied to control of a vehicle equipped with a port injection type of gasoline engine is described in the above examples, the present invention is not limited to this and can also be applied to control of a vehicle equipped with an in-cylinder direct injection type of gasoline engine. Also, the present invention is not limited to control of a vehicle equipped with a gasoline engine and can also be applied to control of a vehicle equipped with another type of engine such as a diesel engine.

Although the example where the present invention is applied to a vehicle equipped with only an engine (internal combustion engine) as the drive source is described in the above examples, the present invention is not limited to this and can also be applied to control of, for example, a hybrid vehicle equipped with an engine and an electric motor (e.g., a traveling motor or generator motor) as drive sources. Furthermore, besides a front-engine rear-wheel drive (FR) vehicle and a front-engine front-wheel drive (FF) vehicle, the present invention can also be applied to control of a four-wheel drive vehicle.

INDUSTRIAL APPLICABILITY

The present invention is applicable to a control device for a vehicle equipped with a drive source for traveling such as an internal combustion engine (engine) and an automatic transmission provided in a drive force transmission route between the drive source and drive wheels. More specifically, the present invention is applicable to a control device for a vehicle that can switch between an automatic gear shift mode in which gear shifting of the automatic transmission is performed according to a vehicle traveling condition, and a manual gear shift mode in which gear shifting of the automatic transmission is performed according to a driver operation.

REFERENCE SIGNS LIST

1 Engine (drive source)
2 Torque converter
3 Automatic transmission
100 ECU
201 Engine speed sensor
202 Throttle opening degree sensor
203 Turbine speed sensor
204 Output speed sensor
205 Accelerator opening degree sensor
206 Shift position sensor
208 Air flow meter
300 Hydraulic control circuit
511 Up-shift switch
512 Down-shift switch

The invention claimed is:

1. A control device for a vehicle for application to a vehicle that is equipped with a drive source for traveling and an automatic transmission, the control device being capable of switching between an automatic gear shift mode in which gear shifting of the automatic transmission is performed according to a vehicle traveling condition, and a manual gear shift mode in which gear shifting of the automatic transmission is performed according to a driver operation, and the control device changing a drive force characteristic by controlling output torque of the drive source at the time of a gear shift mode switch, wherein the control device is configured so as to select, as an initial gear stage or an initial gear ratio for when a switch from the automatic gear shift mode to the manual gear shift mode occurs or as an initial gear stage or an initial gear ratio for when a switch from the manual gear shift mode to the automatic gear shift mode occurs, a gear stage or a gear ratio according to which a direction of change in drive force of the vehicle that accompanies the gear shift mode switch is taken into consideration, the control device comprises an intention determination means for determining whether a driver has an intention to accelerate, and when a switch from the automatic gear shift mode to the manual gear shift mode occurs, if the driver's intention is an intention to accelerate, the control device selects, as an initial gear stage or an initial gear ratio for the manual gear shift mode, a gear stage or a gear ratio according to which the drive force of the vehicle changes in an increasing direction when the gear shift mode occurs, from among selection candidate gear stages or selection candidate gear ratios that can be selected at the time of the switch to the manual gear shift mode.

2. The control device for a vehicle according to claim 1, wherein the control device selects, as the initial gear stage or the initial gear ratio, a gear stage or a gear ratio according to which an amount of increase in the drive force of the vehicle is lowest, from among the selection candidate gear stages or the selection candidate gear ratios.

3. The control device for a vehicle according to claim 1, comprising:

an accelerator opening degree recognition means for recognizing an accelerator pedal opening degree, wherein the intention determination means determines whether the driver has an intention to accelerate or an intention to decelerate based on the accelerator opening degree and/or an amount of change in the accelerator opening degree.

4. The control device for a vehicle according to claim 1, wherein when a switch from the manual gear shift mode to the automatic gear shift mode occurs, if the drive force of the vehicle changes in an increasing direction, the control device selects, as the initial gear stage or the initial gear ratio, a gear stage or a gear ratio according to which an output rotational speed of the drive source changes in an increasing direction, from among selection candidate gear stages or selection candidate gear ratios that can be selected at the time of the switch to the automatic gear shift mode.

5. The control device for a vehicle according to claim 4, wherein the control device selects, as the initial gear stage or the initial gear ratio, a gear stage or a gear ratio according to which an amount of increase in the output rotational speed of the drive source is lowest, from among the selection candidate gear stages or the selection candidate gear ratios.

6. The control device for a vehicle according to claim 1, wherein when a switch from the manual gear shift mode to the automatic gear shift mode occurs, if the drive force of the vehicle changes in a decreasing direction, the control device selects, as the initial gear stage or the initial gear ratio, a gear stage or a gear ratio according to which an output rotational speed of the drive source changes in a decreasing direction, from among selection candidate gear stages or selection candidate gear ratios that can be selected at the time of the switch to the automatic gear shift mode.

7. The control device for a vehicle according to claim 6, wherein the control device selects, as the initial gear stage or the initial gear ratio, a gear stage or a gear ratio according to which an amount of decrease in the output rotational speed of the drive source is lowest, from among the selection candidate gear stages or the selection candidate gear ratios.

8. The control device for a vehicle according to claim 1, wherein when a switch from the manual gear shift mode to the automatic gear shift mode occurs, if a selection candidate gear stage or a selection candidate gear ratio according to which a direction of change in the drive force of the vehicle is the same as a direction of change in an output rotational speed of the drive source does not exist, the control device selects, as the initial gear stage or the initial gear ratio, a gear stage or a gear ratio according to which an amount of change in the output rotational speed of the drive source is lowest, from among the selection candidate gear stages or the selection candidate gear ratios.

9. The control device for a vehicle according to claim 1, wherein when a switch from the manual gear shift mode to the automatic gear shift mode occurs, if selection candidate gear ratios according to which the drive force of the vehicle changes in an increasing direction and a decreasing direction exist, the control device selects, as the initial gear stage or the initial gear ratio for the automatic gear shift mode, a gear stage or a gear ratio according to which an amount of change in the drive force of the vehicle is lowest, from among selection candidate gear stages or selection candidate gear ratios that can be selected at the time of the switch to the automatic gear shift mode.

10. The control device for a vehicle according to claim 1, wherein the automatic transmission is a stepped transmission in which a plurality of gear stages having different gear ratios are established by selectively engaging a plurality of frictional engaging elements.

11. The control device for a vehicle according to claim 1, wherein the automatic transmission is a stepless transmission in which the gear ratio is changed in a stepless manner.

12. A control device for a vehicle for application to a vehicle that is equipped with a drive source for traveling and an automatic transmission, the control device being capable of switching between an automatic gear shift mode in which gear shifting of the automatic transmission is performed according to a vehicle traveling condition, and a manual gear shift mode in which gear shifting of the automatic transmission is performed according to a driver operation, and the control device changing a drive force characteristic by controlling output torque of the drive source at the time of a gear shift mode switch, wherein the control device is configured so as to select, as an initial gear stage or an initial gear ratio for when a switch from the automatic gear shift mode to the manual gear shift mode occurs or as an initial gear stage or an initial gear ratio for when a switch from the manual gear shift mode to the automatic gear shift mode occurs, a gear stage or a gear ratio according to which a direction of change in drive force of the vehicle that accompanies the gear shift mode switch is taken into consideration, the control device comprises an intention determination means for determining whether a driver has an intention to decelerate, and when a switch from the automatic gear shift mode to the manual gear shift mode occurs, if the driver's intention is an intention to decelerate, the control device selects, as an initial gear stage or an initial gear ratio for the manual gear shift mode, a gear stage or a gear ratio according to which the drive force of the vehicle changes in a decreasing direction when the gear shift mode occurs, from among selection candidate gear stages or selection candidate gear ratios that can be selected at the time of the switch to the manual gear shift mode.

13. The control device for a vehicle according to claim 12, wherein the control device selects, as the initial gear stage or the initial gear ratio, a gear stage or a gear ratio according to which an amount of decrease in the drive force of the vehicle is lowest, from among the selection candidate gear stages or the selection candidate gear ratios.

14. The control device for a vehicle according to claim 12, comprising:
   an accelerator opening degree recognition means for recognizing an accelerator pedal opening degree,
   wherein the intention determination means determines whether the driver has an intention to accelerate or an intention to decelerate based on the accelerator opening degree and/or an amount of change in the accelerator opening degree.

15. The control device for a vehicle according to claim 12, wherein when a switch from the manual gear shift mode to the automatic gear shift mode occurs, if the drive force of the vehicle changes in an increasing direction, the control device selects, as the initial gear stage or the initial gear ratio, a gear stage or a gear ratio according to which an output rotational speed of the drive source changes in an increasing direction, from among selection candidate gear stages or selection candidate gear ratios that can be selected at the time of the switch to the automatic gear shift mode.

16. The control device for a vehicle according to claim 12, wherein when a switch from the manual gear shift mode to the automatic gear shift mode occurs, if the drive force of the vehicle changes in a decreasing direction, the control device selects, as the initial gear stage or the initial gear ratio, a gear stage or a gear ratio according to which an output rotational speed of the drive source changes in a decreasing direction, from among selection candidate gear stages or selection candidate gear ratios that can be selected at the time of the switch to the automatic gear shift mode.

17. The control device for a vehicle according to claim 12, wherein when a switch from the manual gear shift mode to the automatic gear shift mode occurs, if a selection candidate gear stage or a selection candidate gear ratio according to which a direction of change in the drive force of the vehicle is the same as a direction of change in an output rotational speed of the drive source does not exist, the control device selects, as the initial gear stage or the initial gear ratio, a gear stage or a gear ratio according to which an amount of change in the output rotational speed of the drive source is lowest, from among the selection candidate gear stages or the selection candidate gear ratios.

18. The control device for a vehicle according to claim 12, wherein when a switch from the manual gear shift mode to the automatic gear shift mode occurs, if selection candidate gear ratios according to which the drive force of the vehicle changes in an increasing direction and a decreasing direction exist, the control device selects, as the initial gear stage or the initial gear ratio for the automatic gear shift mode, a gear stage or a gear ratio according to which an amount of change in the drive force of the vehicle is lowest, from among selection candidate gear stages or selection candidate gear ratios that can be selected at the time of the switch to the automatic gear shift mode.

19. The control device for a vehicle according to claim 12, wherein the automatic transmission is a stepped transmission in which a plurality of gear stages having different gear ratios are established by selectively engaging a plurality of frictional engaging elements.

20. The control device for a vehicle according to claim 12, wherein the automatic transmission is a stepless transmission in which the gear ratio is changed in a stepless manner.

\* \* \* \* \*

UNITED STATES PATENT AND TRADEMARK OFFICE
CERTIFICATE OF CORRECTION

PATENT NO. : 8,951,163 B2
APPLICATION NO. : 13/634850
DATED : February 10, 2015
INVENTOR(S) : Hideaki Otsubo, Masayuki Baba and Takaaki Tokura It is certified that error appears in the above-identified patent and that said Letters Patent is hereby corrected as shown below:

In the Specification

In Column 2, Line 1 after "switching the" delete "chive" and insert -- drive --, therefor.

In Column 3, Line 9 after "set to" delete "au" and insert -- an --, therefor.

In Column 8, Lines 45 - 58 delete
"An intake path id and an exhaust path 1e are connected to the combustion chamber 1c of the engine 1. An intake valve if is provided between the intake path 1d and the combustion chamber 1c, and the intake path 1d and the combustion chamber 1c are put into communication or cut off by driving the intake valve if so as to open/close. Also, an exhaust valve 1g is provided between the combustion chamber 1c and the exhaust path 1e, and the combustion chamber 1c and the exhaust path 1e are put into communication or cut off by driving the exhaust valve 1g so as to open/close. The open/close driving of the intake valve if and the exhaust valve 1g is performed by rotation of an intake camshaft and an exhaust camshaft respectively, to which rotation of the crankshaft 11 is transmitted."
and insert
-- An intake path 1d and an exhaust path 1e are connected to the combustion chamber 1c of the engine 1. An intake valve 1f is provided between the intake path 1d and the combustion chamber 1c, and the intake path 1d and the combustion chamber 1c are put into communication or cut off by driving the intake valve 1f so as to open/close. Also, an exhaust valve 1g is provided between the combustion chamber 1c and the exhaust path 1e, and the combustion chamber 1c and the exhaust path 1e are put into communication or cut off by driving the exhaust valve 1g so as to open/close. The open/close driving of the intake valve 1f and the exhaust valve 1g is performed by rotation of an intake camshaft and an exhaust camshaft respectively, to which rotation of the crankshaft 11 is transmitted. --, therefor.

In Column 11, Line 40 after "shifted" delete "clown" and insert -- down --, therefor.

Signed and Sealed this
Eighth Day of March, 2016

Michelle K. Lee
*Director of the United States Patent and Trademark Office*

CERTIFICATE OF CORRECTION (continued)
U.S. Pat. No. 8,951,163 B2

In the Specification

In Column 14, Line 14 before "switch 512" delete "clown-shift" and insert -- down-shift --, therefor.

In Column 17, Line 59 after "three gear stages" delete "[M-4th], and [M-6th]" and insert --[M-4th], [M-5th], and [M-6th] --, therefor.